United States Patent
Bahm et al.

(10) Patent No.: US 11,909,816 B2
(45) Date of Patent: Feb. 20, 2024

(54) DISTRIBUTED NETWORK ADDRESS DISCOVERY IN NON-UNIFORM NETWORKS

(71) Applicant: Dell Products, L.P., Round Rock, TX (US)

(72) Inventors: Alexander Bahm, Bellevue, WA (US); Rafal Szczesniak, Toronto (CA)

(73) Assignee: DELL PRODUCTS L.P., Round Rock, TX (US)

( * ) Notice: Subject to any disclaimer, the term of this patent is extended or adjusted under 35 U.S.C. 154(b) by 80 days.

(21) Appl. No.: 17/648,645

(22) Filed: Jan. 21, 2022

(65) Prior Publication Data

US 2023/0239344 A1 Jul. 27, 2023

(51) Int. Cl.
*H04L 67/1029* (2022.01)
*H04L 67/61* (2022.01)
(Continued)

(52) U.S. Cl.
CPC ........ *H04L 67/1029* (2013.01); *H04L 67/561* (2022.05); *H04L 67/61* (2022.05); *H04L 67/63* (2022.05)

(58) Field of Classification Search
CPC ........... H04L 67/1001; H04L 67/10015; H04L 67/1004; H04L 67/1008; H04L 67/101;
(Continued)

(56) References Cited

U.S. PATENT DOCUMENTS 6,795,858 B1 * 9/2004 Jain ..................... H04L 67/1008
709/244
7,461,147 B1 * 12/2008 Mowat ................ H04L 67/1029
709/239

(Continued)

FOREIGN PATENT DOCUMENTS

CN 106533973 B * 1/2021 ............. H04L 67/63

OTHER PUBLICATIONS

"Domain Name System (DNS)," https://docs.microsoft.com/en-us/windows-server/networking/dns/dns-top, Jan. 10, 2022, 3 pages.
(Continued)

*Primary Examiner* — Vivek Srivastava
*Assistant Examiner* — William C McBeth
(74) *Attorney, Agent, or Firm* — Amin, Turocy & Watson, LLP

(57) ABSTRACT

Distributed network address discovery in non-uniform node networks can be performed. Regarding a client request for a service, network management component (NMC) can determine a network address space associated with a client based on a network identifier associated with the client or a node identifier. NMC can determine a group of candidate nodes (CN group) from a group of nodes based on network addresses associated with nodes of the node group and the network address space. NMC can determine a group of available candidate nodes (ACN group), from the CN group, available and able to process the request and perform the service based on operational statuses associated with the (Continued)

nodes of the CN group or services associated with those nodes. From the ACN group, NMC can determine a ranked list of network addresses associated with available nodes that can process the request based on defined service performance criteria.

20 Claims, 11 Drawing Sheets

(51) Int. Cl.
*H04L 67/561* (2022.01)
*H04L 67/63* (2022.01)

(58) Field of Classification Search
CPC ............ H04L 67/1014; H04L 67/1021; H04L 67/1029; H04L 67/60; H04L 67/61; H04L 67/63
See application file for complete search history.

(56) References Cited

U.S. PATENT DOCUMENTS

| | | | | |
|---|---|---|---|---|
| 11,570,278 | B1* | 1/2023 | Uthaman | H04L 67/63 |
| 2002/0087707 | A1* | 7/2002 | Stewart | H04L 67/1021 709/245 |
| 2002/0152307 | A1* | 10/2002 | Doyle | H04L 67/1021 709/225 |
| 2004/0133626 | A1* | 7/2004 | Herrero | H04L 67/1021 709/200 |
| 2005/0193114 | A1* | 9/2005 | Colby | H04L 67/1021 709/241 |
| 2006/0117020 | A1* | 6/2006 | Toebes | H04L 67/1021 709/241 |
| 2006/0129665 | A1* | 6/2006 | Toebes | H04L 67/1021 709/223 |
| 2007/0226294 | A1* | 9/2007 | Pruitt | H04L 67/51 709/203 |
| 2009/0172191 | A1* | 7/2009 | Dumitriu | H04L 67/1029 709/241 |
| 2012/0191835 | A1* | 7/2012 | Blackburn | H04L 67/1001 709/223 |
| 2015/0058403 | A1* | 2/2015 | He | H04L 67/1021 709/203 |
| 2017/0163724 | A1* | 6/2017 | Puri | H04L 67/1021 709/203 |
| 2018/0288141 | A1* | 10/2018 | Mo | H04L 67/1001 |
| 2020/0120446 | A1* | 4/2020 | Stammers | H04L 67/1021 |
| 2020/0329109 | A1* | 10/2020 | Ppallan | H04L 67/1021 |
| 2020/0382621 | A1* | 12/2020 | Moreira | H04L 67/1001 |
| 2021/0105191 | A1* | 4/2021 | Yang | H04L 67/61 |

OTHER PUBLICATIONS

"Domain Name System," Wikipedia, https://en.wikipedia.org/wiki/Domain_Name_System, accessed Jan. 13, 2022, 22 pages.

"DNS Protocol," https://ns1.com/resources/dns-protocol, accessed Jan. 21, 2022, 4 pages.

* cited by examiner

DISTRIBUTED NETWORK ADDRESS DISCOVERY IN NON-UNIFORM NETWORKS

TECHNICAL FIELD

This disclosure relates generally to provision of services in a network, e.g., distributed network address discovery in non-uniform networks.

BACKGROUND

A cluster of nodes can provide a set of services to clients. Each service to which a client can connect can have one or more Internet protocol (IP) addresses in an IP address space. Some services can provide functionality to inform their clients about the network capabilities or addresses of local or remote nodes. This task of informing clients about the network capabilities or addresses of local or remote nodes can be quite challenging and problematic, for example, when the clustered system supports both multi-tenancy and multiple networks on the same cluster node. This issue can be even more complicated when services have to consider whether nodes are joining or leaving the group of nodes.

The above-described description is merely intended to provide a contextual overview regarding provision of services in a network, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising a processor, a group of available candidate nodes of a group of nodes that is able to process a client request associated with a client device and relating to a service based on a network address space associated with a network address associated with the client device, a service type of the service, and/or respective operational statuses and respective network addresses of respective nodes of the group of nodes. The method further can comprise determining, by the system, a node of the group of available candidate nodes that is to process the client request based on a defined service performance criterion associated with the service.

In certain embodiments, the disclosed subject matter can comprise a system that can include a memory that stores computer executable components, and a processor that executes computer executable components stored in the memory. The computer executable components can comprise a request component that can receive a request from a device, wherein the request can relate to a service. The computer executable components also can include a network management component that can determine a group of available candidate nodes of a group of nodes that is able to process the request based on a network address space associated with a network address associated with the device, a service type of the service, and/or respective operational statuses and respective network addresses of respective nodes of the group of nodes. The network management component can determine a node of the group of available candidate nodes that is to process the request based on a defined service performance criterion associated with the device.

In still other embodiments, a non-transitory machine-readable medium, comprising executable instructions that, when executed by a processor, facilitate performance of operations. The operations can comprise determining a group of available candidate node devices of a group of node devices that is able to process a query associated with a device and relating to a service based on a network address space associated with a network address associated with the device, a service type of the service, and/or respective operational statuses and respective network addresses of respective node devices of the group of node devices. The operations also can comprise determining a node device of the group of available candidate node devices that is to process the query based on a defined service performance criterion associated with the group of available candidate node devices.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
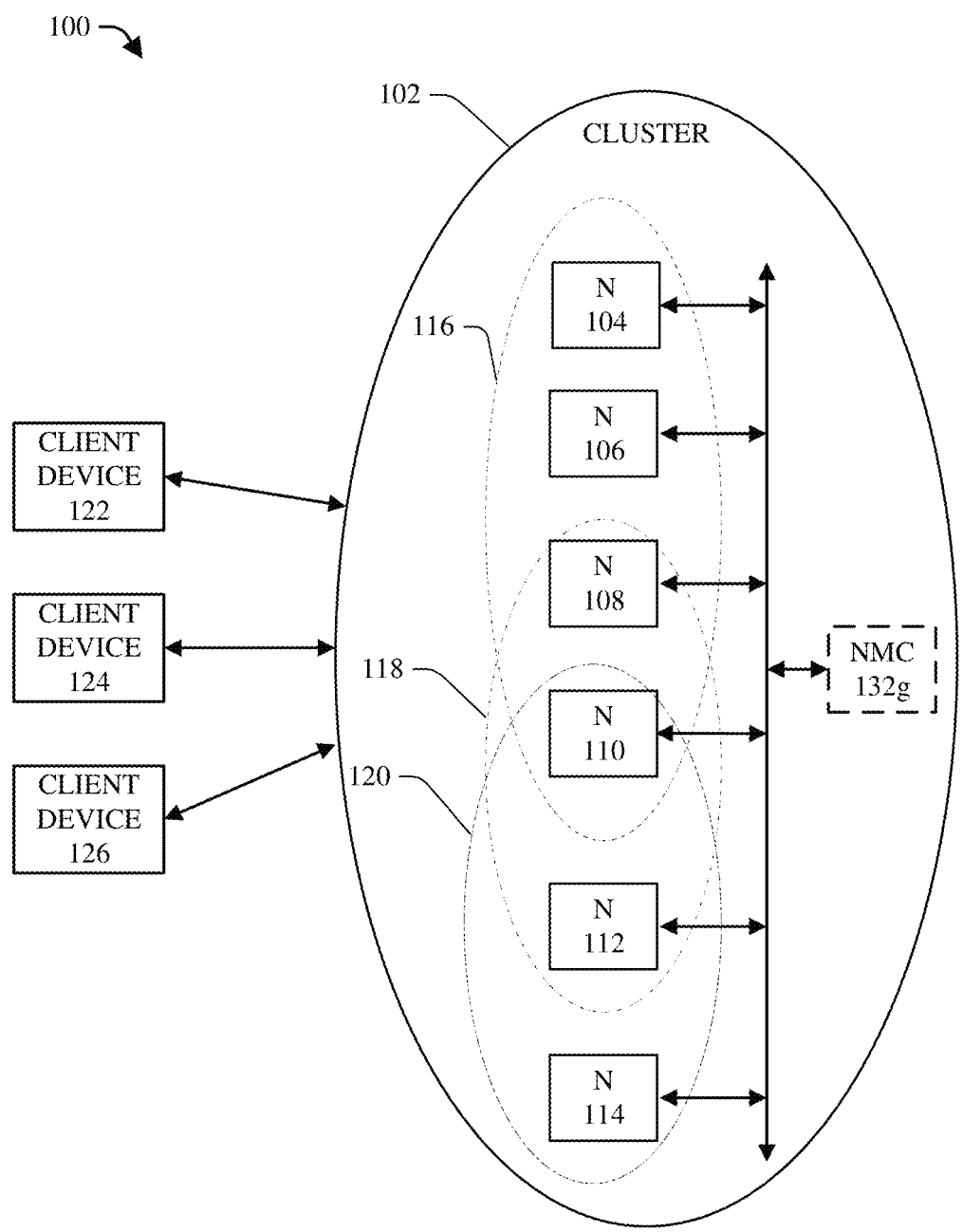
FIG. 1 illustrates a block diagram of an example system that can desirably perform and manage distributed network address discovery in non-uniform networks to facilitate processing of client requests and performance of services on behalf of clients by nodes, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A cluster of nodes can provide a set of services to clients. Each service to which a client can connect can have one or more Internet protocol (IP) addresses in an IP address space. Some services can provide functionality to inform their clients about the network capabilities or addresses of local or remote nodes. This task of informing clients about the network capabilities or addresses of local or remote nodes can be quite challenging and problematic, for example, when the clustered system supports both multi-tenancy and multiple networks on the same cluster node. This issue can be even more complicated when services have to consider whether nodes are joining or leaving the group of nodes.

To that end, techniques for desirably (e.g., efficiently, suitably, or optimally) performing and managing distributed network address discovery in non-uniform node networks are presented. A system can comprise one or more clusters, wherein a cluster can comprise one or more networks of network addresses (e.g., IP addresses) associated with interfaces (e.g., network or interconnect interfaces) and nodes. Each of the nodes associated with a cluster can comprise one or more interfaces that can be associated with one or more network addresses. In some embodiments, the nodes associated with a cluster can be associated with (e.g., communicatively connected to) the other nodes associated with the cluster. Each node associated with a cluster can be associated with one or more networks of network addresses of such cluster, wherein a network can be a generally (e.g., publicly) available network which a client device associated with a client can utilize to connect to a network of the cluster. Each node can perform one or more services. For instance, a node can process a request (e.g., client request) from a client device and perform a desired service in response to the request.

The disclosed subject matter can comprise a network management component (NMC) that can perform and manage distributed network address discovery in non-uniform node networks of nodes. The NMC can monitor and track the networks of nodes, including monitoring and tracking one or more networks (e.g., various different networks) with which a node can be a member, and the availability of nodes to process requests and perform services. The NMC also can determine which node(s) of the group of nodes can be available and/or a desirable (e.g., appropriate or optimal) node(s) to process a request and provide the service to the client device, in accordance with defined network management criteria, which can comprise service performance criteria relating to service performance, for example, in connection with responding to client requests for services and provision of services by nodes associated with a network.

Client devices can contact or connect to service servers to request services and/or information, where the service servers can facilitate processing of requests (e.g., queries) and provision of services relating thereto. In response to receiving a request for a service from a client device, a service server, which also can be referred to as a client service server, can communicate the request for the service associated with the client device to the NMC.

The NMC can receive the request for the service from the client service server. The NMC can analyze the request (e.g., analyze the information (e.g., request-related information) contained in or associated with the request). The information associated with the request can comprise, for example, a network identifier associated with a connection (e.g., communication connection) associated with the client device, a type of service, the service and/or information that is requested by the client device, a node identifier, and/or other desired request-related information. A network identifier can comprise, for example, a network address (e.g., Internet protocol (IP) address), a virtual local area network (VLAN) tag, a name of a configured network address space, or other type of network identifier, associated with a connection associated with a client device (e.g., a connection of the client device to a service server of a cluster). A node identifier can relate to and identify, for example, a local node, any remote node (e.g., node associated with a remote node network) with connectivity, or a specific remote node.

Based at least in part on the results of analyzing the request, including the network identifier associated with the client device and/or a node identifier (if a node identifier was included), the NMC can determine a network address space associated with the client device, wherein the network address space can indicate one or more network addresses that can be usable by or compatible with the client device. For instance, the network address space can comprise one or more network addresses that the client device can have permission or authorization to use with regard to a node network(s). The NMC can determine a group of candidate nodes from a group of nodes based at least in part on respective network addresses associated with respective nodes of the group of nodes and the network address space associated with the client device. For instance, the NMC can include nodes associated with network addresses that are within or associated with the network address space in the group of candidate nodes, and can filter out nodes associated with network addresses that are not within or associated with the network address space.

From the group of candidate nodes, the NMC can determine one or more available candidate nodes (e.g., a group of available candidate nodes) that are available and able to process the request and perform the service associated with the request based at least in part on the service type of the requested service and respective operational statuses associated with the respective nodes of the group of candidate nodes and/or the respective services associated with (e.g., able to be provided by) the respective nodes of the group of candidate nodes. For instance, the NMC can analyze the monitored or tracked information relating to the operation of the respective nodes of the group of candidate nodes and/or the respective services associated with those respective nodes. The NMC can determine the respective operational statuses of the respective nodes and/or the respective services based at least in part on the results of such analysis. Based at least in part on the respective operational statuses of the respective nodes and/or the respective services, the NMC can include nodes of the group of candidate nodes, which are determined to be available and able to perform the requested service, in the group of available candidate nodes, and can filter out other nodes of the group of candidate nodes that are unavailable (e.g., deactivated, inactive, busy, or otherwise unavailable) or not able to perform (e.g., do not run) the requested service.

From respective network addresses associated with one or more respective available candidate nodes of the group of available candidate nodes, the NMC can determine a ranked group (e.g., a ranked list or order) of network addresses associated with the one or more available candidate nodes based at least in part on defined service performance criteria and/or a client preference, wherein one or more of the network addresses of the ranked group of network addresses can be available and selectable for use by the client device to facilitate connection of the client device to one or more interfaces of one or more of the available candidate nodes (e.g., associated with the one or more network addresses) and enabling the one or more available candidate nodes to process the request and perform the requested service. For instance, the NMC can determine respective rankings for respective network addresses associated with the one or more available candidate nodes, and can determine the ranked group of network addresses, based at least in part on respective bandwidths associated with the one or more respective available candidate nodes, whether a safe failover is to be applied in connection with processing the request, respective loads associated with the one or more respective available candidate nodes, and/or respective speeds associated with respective interfaces associated with the one or more respective available candidate nodes, in accordance with the defined service performance criteria and/or the client preference, such as more fully described herein.

The NMC can present (e.g., communicate, display, or otherwise present) information relating to the ranked group of network addresses, a determined or selected network address(es), and/or a determined or selected node(s) from the group of available candidate nodes (e.g., based on the respective rankings of the respective network addresses associated with the network and associated available candidate nodes), to the client service server. In some embodiments, the client service server can determine or select one or more network addresses from the ranked group of network addresses (e.g., based on the respective rankings of the respective network addresses, the defined service performance criteria, and/or the client preference) for the client device to use, or can have the client device use the one or more determined or selected network addresses (e.g., as determined or selected by the NMC), to connect the client device to the network via one or more communication connections associated with one or more interfaces (e.g., that are associated with the one or more network addresses) associated with the one or more available candidate nodes, wherein the one or more available candidate nodes can process the request and perform the service relating to the request for the client device. In other embodiments, the client service server can present the information relating to the ranked group of network addresses, the determined or selected network address(es), and/or the determined or selected available candidate node(s), to the client device, and the client device can determine or select one or more network addresses from the ranked group of network addresses (e.g., in accordance with the respective rankings of the respective network addresses, the defined service performance criteria, and/or the client preference), or can utilize the one or more determined or selected network addresses (e.g., as selected by the service server or NMC in accordance with the respective rankings, the defined service performance criteria, and/or the client preference), to connect the client device to one or more interfaces (e.g., associated with the one or more network addresses) associated with the one or more available candidate nodes, wherein the one or more available candidate nodes can process the request and perform the service relating to the request for the client device. After the one or more available candidate nodes process the request and perform the service, the one or more available candidate nodes can provide information relating to the request (e.g., information responsive to the request) to the client device via the one or more connections associated with the one or more network addresses.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) perform and manage distributed network address discovery in non-uniform networks to facilitate processing of client requests and performance of services on behalf of clients by nodes, in accordance with various aspects and embodiments of the disclosed subject matter. The system 100 can comprise a cluster of network addresses 102 (e.g., IP addresses, which also can include virtual IP addresses). The cluster of network addresses 102 can comprise a desired number of networks of network addresses, wherein respective network addresses of a network can be associated with respective interfaces (e.g., network or interconnect interfaces) associated with respective nodes. For instance, the cluster 102 can be associated with a group of nodes, including node (N) 104, node 106, node 108, node 110, node 112, and/or node 114. It is to be appreciated and understood that, while cluster 102 is depicted as being associated with six nodes, in other embodiments, the cluster 102 can be associated with more than six nodes or less than six nodes.

Each node (e.g., 104, 106, 108, 110, 112, or 114) can comprise, employ, and/or access data processing resources (e.g., processor(s)), storage resources (e.g., data store(s)), applications, and/or other resources that can enable the node to perform one or more services. The one or more services can be or can relate to, for example, data processing, video streaming, audio streaming, data security or protection, multimedia service, news service, financial service, social networking, and/or another desired type of service. The nodes can be associated with (e.g., communicatively connected to) each other, for example, through a back-end network.

Respective network addresses, which can be associated with respective interfaces associated with respective nodes (e.g., 104, 106, 108, 110, 112, and/or 114), can be grouped together to form one or more respective networks of network addresses. Each network address can be part of one network of network addresses of the cluster 102. Each node can be associated with (e.g., can be assigned) a desired number of network addresses where the network addresses can be associated with the same network or where respective network addresses can be associated with respective networks of network addresses. For example, network addresses of a first network (e.g., network 116) and other network addresses of a second network (e.g., network 118) can be associated with a node (e.g., node 104).

In some embodiments, the cluster 102 can comprise network 116, comprising a first group of network addresses associated with nodes 104, 106, 108, and 110 (e.g., associated with respective interfaces associated with nodes 104, 106, 108, and 110); network 118, comprising a second group of network addresses associated with nodes 108, 110, and 112 (e.g., associated with respective interfaces associated with nodes 108, 110, and 112); and network 120 comprising a third group of network addresses associated with nodes 110, 112, and 114 (e.g., associated with respective interfaces associated with nodes 110, 112, and 114). It is noted that, in some embodiments, network addresses (e.g., IP addresses, which can include virtual IP addresses) associated with a node can be moved or migrated to another node(s), if the node is offline or deactivated, or for another desired reason. As can be observed in FIG. 1, nodes 108 and 110 can be associated with network 116 and network 118, and nodes 110 and 112 can be associated with network 118 and network 120. It is to be appreciated and understood that networks 116, 118, and 120 are example networks of network addresses (and associated interfaces and nodes), and, in other embodiments, the cluster 102 can contain more or less than three networks and/or each network can be associated a number of nodes (and respective numbers of network addresses and interfaces) that can be different than depicted in FIG. 1 and described herein.

The cluster 102 can support multiple tenants, such as, for example, client device 122, client device 124, and client device 126 and respectively associated clients, in addition to supporting multiple networks of network addresses (e.g., networks 116, 118, and/or 120). In some embodiments, the cluster 102 can support multiple tenants not only in that the cluster 102 can support multiple respective tenants connecting to the cluster 102 (e.g., respective tenants connecting to a network or to respective networks of the cluster 102), but also that the cluster 102 can be divided (e.g., logically divided) from a security standpoint into separate access zones or security domains such that first data, files, or other data objects associated with a first tenant (or a first department of a first tenant) can be securely separated or isolated from second data, files, or other data objects associated with a second tenant (or a second department of the first tenant). For instance, the first data, files, or other data objects associated with the first tenant can be part of a first security domain (e.g., first access zone) and the second data, files, or other data objects associated with the second tenant can be part of a second security domain (e.g., second access zone), wherein the first security domain and the second security domain can be securely separated and isolated from each other. As an example, if a shared service provider uses the same cluster (e.g., cluster 102) to store data for different (e.g., separate) companies, where it can be desired that a company should not be able to access, view, or use the data of another company, the cluster 102 (e.g., employing the nodes) can securely separate or isolate the respective data of the respective companies from the other data of the other companies, and from being able to be accessed, viewed, or used by the other companies (e.g., entities of the other companies). As another example, with regard to different departments within a same company, where it can be desired that a first department of the company should not be able to access, view, or use the data of a second department of the company, the cluster 102 (e.g., employing the nodes) can securely separate or isolate first data of the first department from second data of the second department, and can separate or isolate the first data from being able to be accessed, viewed, or used by the second department (e.g., entities of the second department), and vice versa. In certain embodiments, separate access zones can be associated with separate networks of network address, which can facilitate distinguishing them from each other.

A client device (e.g., 122, 124, or 126) can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

Figure 2:
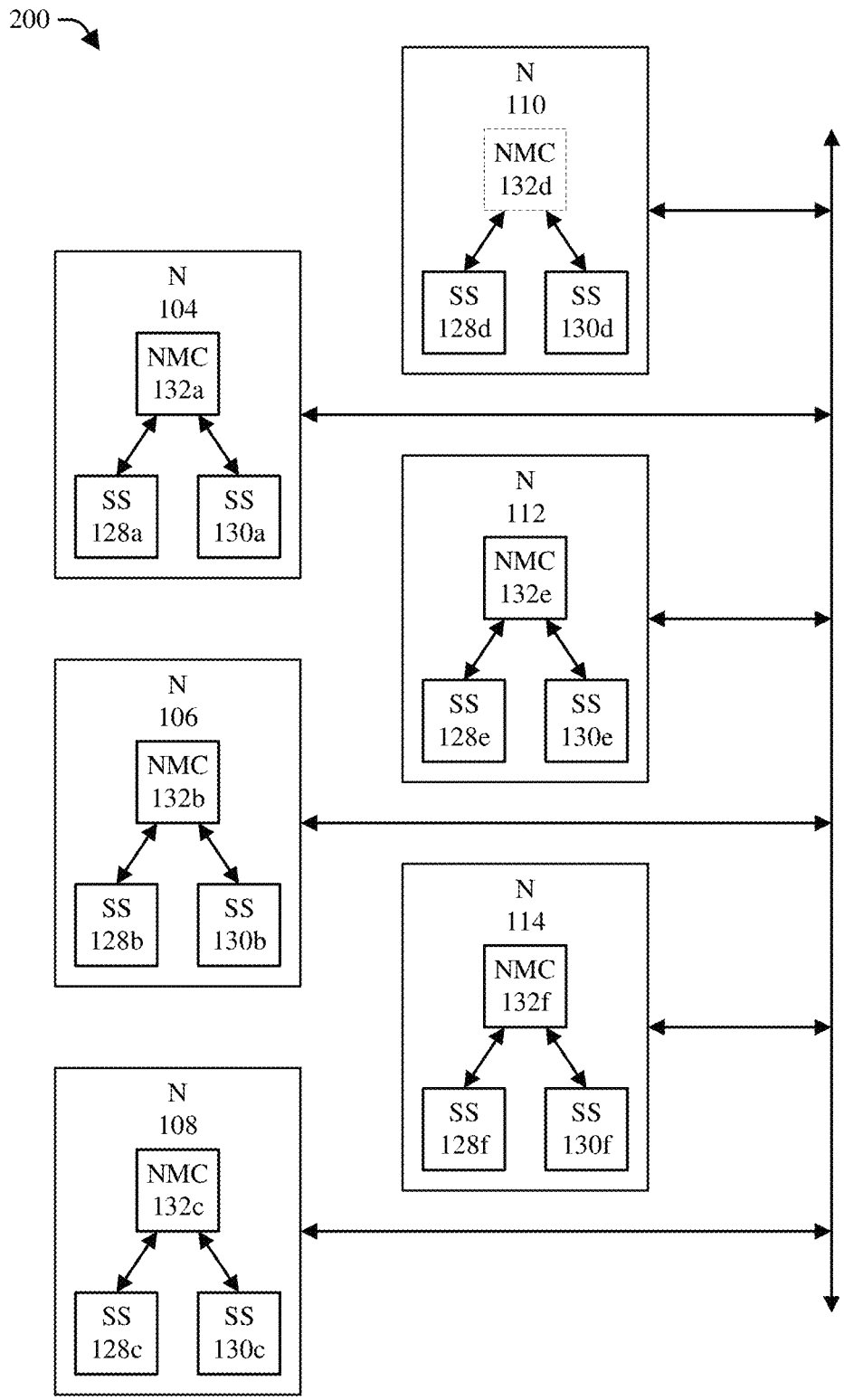
FIG. 2 depicts a block diagram of example nodes that can comprise service servers and/or network management components that can facilitate handling client requests for services, in accordance with various aspects and embodiments of the disclosed subject matter.

Referring to FIG. 2 (along with FIG. 1), FIG. 2 depicts a block diagram of example nodes 200 that can comprise service servers and/or network management components that can facilitate handling client requests for services, in accordance with various aspects and embodiments of the disclosed subject matter. The example nodes can comprise, for example, the nodes 104, 106, 108, 110, 112, and 114, which can be associated with the cluster 102.

At desired times, one or more of the client devices (e.g., 122, 124, and/or 126) can desire to utilize one or more of the services that can be performed by one or more respective nodes (e.g., 104, 106, 108, 110, 112, and/or 114) of the cluster 102. To facilitate provision of services, the nodes 104, 106, 108, 110, 112, and 114 can comprise, respectively, a first type of service server (SS) 128*a*, 128*b*, 128*c*, 128*d*, 128*e*, and 128*f*; a second type of service server 130*a*, 130*b*, 130*c*, 130*d*, 130*e*, and 130*f*; and/or another type of service server. For reasons of brevity, the disclosed subject matter may refer to a first type of service server as service server 128, which can be or represent whichever of service server 128*a*, 128*b*, 128*c*, 128*d*, 128*e*, or 128*f* is handling a client request; or may refer to a second type of service server as service server 130, which can be or represent whichever of service server 130*a*, 130*b*, 130*c*, 130*d*, 130, or 130*f* is handling a client request. When a client device (e.g., 122, 124, or 126) desires to access and utilize a service, the client device can contact or connect to a service server, which, depending on the type of service desired by the client can be, for example, service server (e.g., 128) associated with a first type of service or service server (e.g., 130) associated with a second type of service, wherein the service server can provide or facilitate providing the desired service(s) via one or more interfaces (e.g., associated with one or more network addresses) associated with one or more networks and one or more nodes that are associated with the cluster 102. A service server also can be referred to herein as a client service server, as the service server sometimes can be acting as a client with respect to the clusters of nodes (e.g., cluster 102).

There can be various types of service servers. For example, a service server (e.g., 128 or 130) can be a server message block (SMB) server (e.g., an SMB multichannel server), a service server that can employ and provide a data mover service, or another desired type of service server. An SMB multichannel server can employ a desired SMB protocol to facilitate establishing a single SMB session over one or multiple network connections, which can improve (e.g., increase) data transfer speeds, provide desired data redundancy, and/or improve performance and reliability in processing service requests. A service server that employs a data mover service can utilize the data mover service to move data between different types of client service servers, which can have respective (e.g., different) protocols and semantics associated with the data. In some embodiments, the service server can attempt to establish connections to usable nodes (e.g., available candidate nodes) in the network associated with the client device, can create a mesh of connections between multiple (e.g., a desired number of; or many) source servers or nodes and destination servers or nodes, and/or can establish a "many to many" connection spread across all or a desired portion of available candidate nodes (e.g., establish connections between each available candidate node of the desired portion of available candidate nodes and the other available candidate nodes of the desired portion of available candidate nodes).

As disclosed, each service to which a client can connect can have one or more network addresses (e.g., IP addresses) in a network address space (e.g., an IP address space). In some embodiments, the services associated with the cluster 102 can provide functionality to inform their clients about the network capabilities or addresses of local or remote nodes (e.g., 104, 106, 108, 110, 112, and/or 114) of the cluster 102. As disclosed, the task of informing clients about the network capabilities or addresses of local or remote nodes typically can be quite challenging and problematic, for example, when the clustered system supports both multi-tenancy and multiple networks on the same cluster node. This issue can be even more complicated when services have to consider whether nodes are joining or leaving the group of nodes (e.g., due to be moved, offline, deactivated, or otherwise joining or leaving the group of nodes). Existing node cluster systems and techniques can suffer from various deficiencies with regard to identifying network capabilities and addresses of local or remote nodes when such node cluster systems support multi-tenancy and multiple networks on the same cluster node, identifying suitable nodes to perform services for clients, and connecting clients to nodes, as well as other problems.

The disclosed subject matter can comprise a network management component(s) (NMC(s)), techniques, and processes that can overcome the deficiencies of existing node cluster systems and techniques with regard to informing clients about the network capabilities or addresses of local or remote nodes, identifying desirable (e.g., suitable, preferable, or optimal) interfaces, network addresses, and associated nodes that can be utilized to perform a desired service for a client, and managing connections of clients to interfaces (e.g., via network addresses) and associated nodes. In some embodiments, the nodes 104, 106, 108, 110, 112, and 114 can comprise NMCs 132a, 132b, 132c, 132d, 132e, and 132f, respectively. In other embodiments, additionally or alternatively, the system 100 can comprise an NMC 132g that can be associated with (e.g., communicatively connected to) the cluster(s) of nodes (e.g., cluster 102). The NMCs 132a, 132b, 132c, 132d, 132e, and 132f (and/or 132g) can coordinate and synchronize with each other, and can exchange information with each other, to facilitate identifying desirable interfaces, network addresses, and associated nodes that can be utilized to perform a desired service for a client, and managing connections of clients to interfaces and associated nodes, wherein such information can comprise or relate to interfaces, network addresses, operational statuses of nodes and associated services, network identifiers, node identifiers, and/or other desired information.

In certain embodiments, when a client request is received by a service server (e.g., 128a, 128b, 128c, 128d, 128e, or 128f; or 130a, 130b, 130c, 130d, 130e, or 130f) from a client device (e.g., 122), the client request typically can be handled by that service server and the associated NMC (e.g., 132a, 132b, 132c, 132d, 132e, or 132f (and/or 132g)). For instance, if service server 128a receives the client request from a client device, the service server 128a and NMC 132a of the node 104 can handle the client request.

In other embodiments, when a client request is received by a service server from a client device, the client request can be handled by a desired service server and associated desired NMC that can be determined and selected based at least in part on the defined network management criteria (e.g., network management criteria relating to the respective number of client requests being handled by respective service servers and associated NMCs and/or a defined threshold number of client requests being handled by a service server and associated NMC). As some examples, in response to a first service server associated with a first node receiving the client request, with the first node comprising a first NMC, the first NMC can determine that the service server and associated NMC that are currently handling the lowest number of client requests are to handle the received client request; or the first NMC can determine that the first service server and the associated first NMC are to handle the received client request, unless they are currently handling a number of client requests that satisfies (e.g., exceeds, or is greater than) a defined threshold maximum number of client requests.

Figure 3:
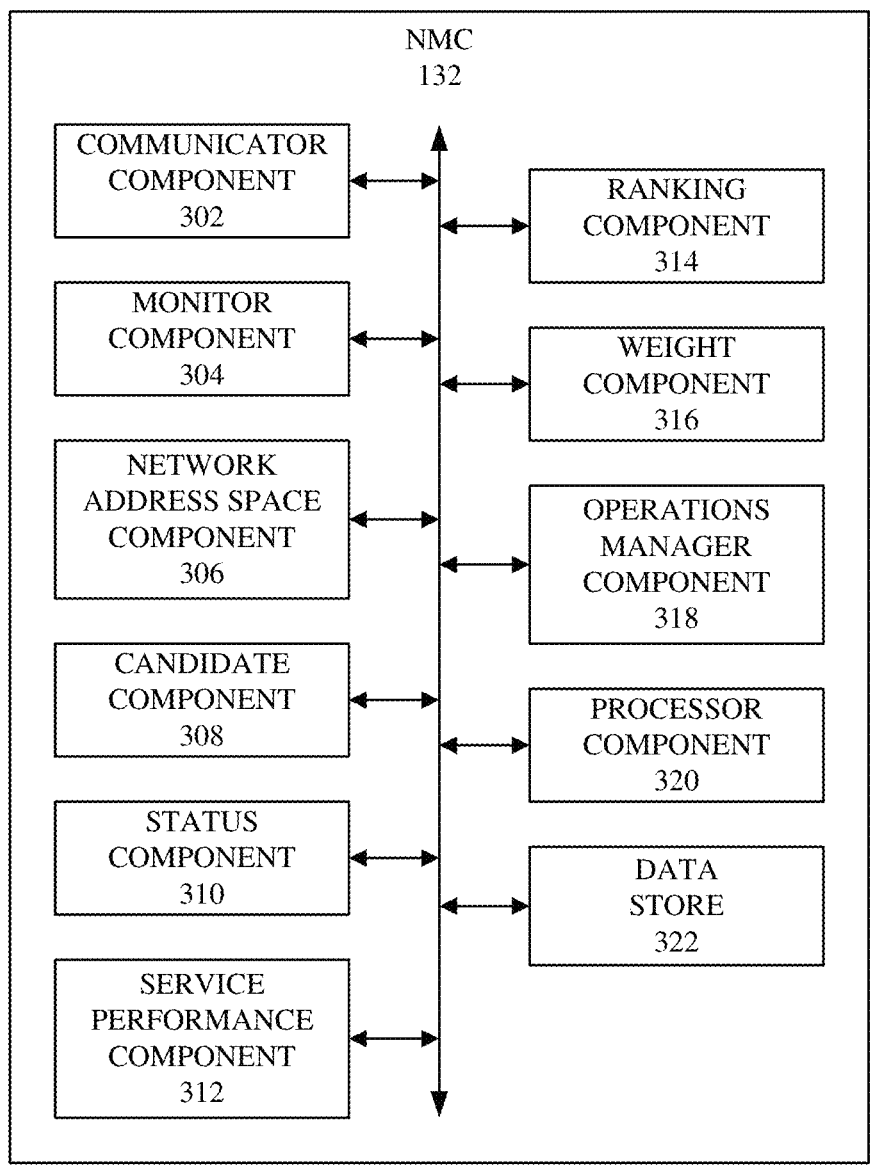
FIG. 3 depicts a block diagram of an example network management component, in accordance with various aspects and embodiments of the disclosed subject matter.

Referring to FIG. 3 (along with FIGS. 1 and 2), FIG. 3 depicts a block diagram of an example NMC 132, in accordance with various aspects and embodiments of the disclosed subject matter. In accordance with various embodiments, the NMC 132 can comprise a communicator component 302, a monitor component 304, a network address space component 306, a candidate component 308, a status component 310, a service performance component 312, a ranking component 314, a weight component 316, an operations manager component 318, a processor component 320, and/or a data store 322. It is to be appreciated and understood that, when NMC 132 is referenced and described herein, the NMC 132 can be the same as, and/or can individually or collectively refer to, NMCs 132a, 132b, 132c, 132d, 132e, and/or 132f (and/or 132g).

The communicator component 302 can receive data from other components or devices, or can transmit data to other components or devices. For instance, the communicator component 302 can receive requests, and request-related information associated with the requests, from the service servers (e.g., 128a, 128b, 128c, 128d, 128e, or 128f; or 130a, 130b, 130c, 130d, 130e, or 130f), can receive, from the nodes (e.g., 104, 106, 108, 110, 112, and/or 114) or other sources (e.g., other data sources), operational status data relating to operational statuses of nodes and/or services associated with (e.g., services run by) the nodes, and/or can receive other desired information from another component or device. The NMC 132 also can utilize the communicator component 302, for example, to communicate data, such as data relating to a ranked ordering of network addresses that can be utilized to process and/or respond to a request associated with a client device (e.g., 122, 124, or 126), to a service server (e.g., 128 or 130) that is handling the request for the client device.

The monitor component 304 can monitor or track the respective operational statuses of respective nodes (e.g., 104, 106, 108, 110, 112, and/or 114) associated with the respective networks of network addresses (e.g., 116, 118, and/or 120) and the cluster(s) 102 and/or the respective services associated with the respective nodes. For instance, the monitor component 304 can monitor or track the activation status of a node to determine whether a node is active or inactive (e.g., deactivated), whether the node has joined or left, or is about to join or leave, the group of nodes associated with the cluster 102 or a network (e.g., 116, 118, or 120), and/or whether the node is otherwise available or unavailable. The monitor component 304 can monitor or track which service or services are operating (e.g., running) on a node (e.g., 104, 106, 108, 110, 112, or 114) at a given time, and the operational status(es) of service or services operating on the node at the given time. The monitor component 304 also can monitor or track the level of the load on the node (e.g., local node associated with the NMC) and/or associated service, and can obtain information relating to the other respective load levels associated with the other respective nodes and/or the respective services associated with the other respective nodes from other NMCs of the other nodes to facilitate tracking the other respective load levels, at a given time. The monitor component 304 further can monitor or track the operational statuses of local interfaces and local server services associated with a node. The monitor component 304 also can monitor or track the operational status(es) of an interface or interfaces (e.g., Ethernet, InfiniBand, fiber channel, or other type of interconnect interface) of a network(s) (e.g., 116, 118, and/or 120) or associated service(s) to facilitate determining whether the interface or interfaces is or are up and running, or is or are down and unavailable. As described herein, an NMC of a node can communicate (e.g., via communicator component 302) information relating to the operational statuses of the local interfaces and local services associated with that node to the NMCs of the other nodes to facilitate updating the other NMCs and synchronizing with the other NMCs of the other nodes with regard to the respective operational statuses of respective interfaces and respective services associated with the respective nodes.

The NMC 132 can utilize the information relating to the respective operational statuses of the respective nodes (e.g., 104, 106, 108, 110, 112, and/or 114) and/or the respective services associated with the respective nodes to facilitate determining which nodes are available candidate nodes and/or determining a ranked ordering of network addresses associated with respective available candidate nodes based on respective desirability (e.g., suitability or favorability) of the respective network addresses with regard to being utilized to facilitate processing the request and performing the requested service, such as more fully described herein. It is to be appreciated and understood that, while the monitor component 304 is depicted as being part of the NMC 132, in other embodiments, the monitor component 304 can be a distinct monitoring system that can be separate from, and associated with (e.g., communicatively connected to), the NMC 132.

In some embodiments, when a client device (e.g., 122) desires to utilize a service, the client device can connect to a service server (e.g., 128 or 130) and communicate a request for the desired service to the service server. In some instances, in connection with the client request for a service, the client device (e.g., 122) can desire to have additional resources, and can request (e.g., can explicitly request) that the service server provide information relating to one or more network addresses (and one or more associated communication connections and one or more associated interfaces) via which the client device can access such additional resources. In such instances, the service server can engage with the NMC 132 to request that the NMC 132 provide information relating to one or more network addresses (and one or more associated communication connections and one or more associated interfaces) that the client device can utilize to access the desired additional resources. In other instances, a service server can determine whether to request additional resources on behalf of the client device in connection with the client request for a service, based at least in part on the behavior of the service server. For instance, in connection with the client request, a client device may not explicitly request additional resources, however, given the nature of the client request and the behavior of the service server, the client device may be implicitly requesting additional resources with regard to the client request. In such instances, if, based on the behavior of the service server, the service server determines that it can be desirable for the service server to request additional resources on behalf of the client device in connection with the client request in order for the service server to operate properly, the service server can engage with the NMC 132 to request additional resources and information (e.g., information relating to network addresses) in order to desirably handle the client request.

In accordance with various embodiments, in instances when the service server (e.g., 128 or 130) is engaging with the NMC 132 to request information relating to network addresses in connection with a client request, the service server (e.g., 128 or 130) can determine or identify the network address (e.g., local IP address) associated with the client device (e.g., a network address associated with a communication connection of the client device (e.g., 122) to a service server associated with the cluster 102) or a name of a configured network (if any) associated with the client device (e.g., 122) based at least in part on the results of analyzing the request-related information of or associated with the request (e.g., information contained in the request or metadata, such as device identifier that can identify the client device or a network address associated with the request and client device). The service server (e.g., 128 or 130) can communicate the request for the desired service, including a network identifier associated with the request and/or a node identifier relating to the NMC 132 associated with the node, which can receive (e.g., via the communicator component 302) the request, including the network identifier and/or the node identifier. The network identifier can comprise, for example, the network address (e.g., local IP address associated with a communication connection of the client device), a VLAN tag, a name of the configured network address space, or other network identifier, associated with the client device. In some embodiments, if the node identifier is included with the request, the node identifier can indicate, for example, a local node, any remote node with connectivity, or a specific remote node, which can be desired to be used to process the request and perform the desired service.

It is to be appreciated and understood that, with regard to client request for a service, a client, client device (e.g., 122, 124, or 126), and service server (e.g., 128 or 130) do not necessarily have to know any of the configuration of the network address space or the logic (e.g., business logic or other logic) regarding how to manage multi-tenancy and disjoint networks on the same node. In some embodiments, the service server can provide the network address that the client device is connected to, or another type of network identifier (e.g., name of the configured network address space or VLAN tag) associated with the client request to the NMC 132, the NMC 132 can determine a response (e.g., a list of ranked and suitable network addresses) based at least in part on such network address or other network identifier, and the service server or client device can utilize the response from the NMC 132 to select one or more network addresses for processing the client request for the desired service, such as described herein.

The NMC 132 can analyze the request-related information of or associated with the request for the desired service, including the network identifier and/or the node identifier. Based at least in part on the results of such analysis, the NMC 132, employing the network address space component 306, can determine or identify the network address space associated with the client device (e.g., 122). For instance, based at least in part on such analysis results, in including the results of analyzing the network identifier (e.g., network address the client is connected to, VLAN tag, or name of the configured network address space), the network address space component 306 can determine or identify the network address space associated with the client device (e.g., 122). In some embodiments, the network identifier and/or the node identifier can be accessible to the NMC 132 through a data structure that can support an O(1) lookup (e.g., an O(1) lookup performed by the NMC 132), which can enable and ensure desirably fast response times for determination of the network identifier and/or the node identifier by the NMC 132.

The NMC 132, employing the candidate component 308, can determine a group of candidate nodes, from the group of nodes (e.g., 104, 106, 108, 110, 112, and/or 114) of the cluster 102, based at least in part on the network address space associated with the network identifier associated with the client device (e.g., 122) and respective network addresses associated with the respective nodes of the group of nodes, and/or the node identifier (if any). For instance, after the network address space available to the client device (e.g., 122) has been identified, the candidate component 308 can determine whether one or more nodes of the group of nodes exists in the network address space associated with the network identifier associated with the client device. This can be performed by the NMC 132 (e.g., employing the candidate component 308) because the NMC 132 can be a source (e.g., a central source) of knowledge regarding how all network addresses are configured. This can mean that the NMC 132 can know how individual network addresses, and thus, network address spaces, are assigned to each node of the group of nodes (e.g., 104, 106, 108, 110, 112, and/or 114) of the cluster 102. For instance, the candidate component 308 can determine which, if any, of the respective network addresses associated with the respective nodes are in (e.g., are part of, included in, or located in) the network address space associated with the network identifier associated with the client device (e.g., 122), and can include any of the respective nodes, which have respective network addresses that are in the network address space, in the group of candidate nodes, and can filter out or rule out any nodes associated with respective network addresses that are not in the network address space (e.g., that are outside of the network address space).

For example, if the network address space associated with the network identifier associated with the client device (e.g., 122) comprises network address 11 up through network address 20, and the respective network addresses associated with the respective nodes of the group of nodes (e.g., 104, 106, 108, 110, 112, and/or 114) are network address 11 associated with node 104, network address 14 associated with node 106, network addresses 12 and 15 associated with node 108, network addresses 16 and 18 associated with node 110, network address 8 associated with node 112, and network address 22 associated with node 114, based at least in part on the results of analyzing the network address space associated with the client device and the respective network addresses associated with the respective nodes, the candidate component 308 can determine that nodes 104, 106, 108, and 110 can be candidate nodes that can be in the group of candidate nodes, because their respective network addresses are within the network address space, and can determine that nodes 112 and 114 are to be filtered out and not part of the group of candidate nodes because their respective network addresses are not within the network address space.

It is to be appreciated and understood that, while this example describes network addresses 11 through 20, which can be generic network addresses in a generic network address format, network addresses can be in virtually any type of network address in virtually any desired network address format, including, for example, an IPv4 address (e.g., a 32-bit IPv4 address), an IPv6 address (e.g., a 128-bit IPv6 address), or other desired type or version of IP address. It also is to be appreciated and understood that, while this example only references one or two network addresses for each node, each of the nodes (e.g., 104, 106, 108, 110, 112, and/or 114) can comprise or be associated with virtually any desired number (e.g., 1, 2, . . . , 5, . . . 10, . . . 20, . . . , 50, . . . , 100, or more) of network addresses.

If the candidate component 308 determines that none of the respective network addresses associated with the respective nodes of the group of nodes are part of the network address space associated with the network identifier associated with the client device (e.g., 122), the NMC 132 can generate and present (e.g., via the communicator component 302) an error message (or notification message) to the service server (e.g., 128), wherein the error message (or notification message) can indicate that there is no candidate node of the group of nodes that is in the network address space associated with the network identifier associated with the client device (e.g., 122), and thus, there is no candidate node that is able or permitted to process the request and provide the desired (e.g., requested) service to the client device. The service server (e.g., 128) can communicate a message (e.g., a corresponding error or notification message) to the client device (e.g., 122) to notify the client device and associated client that there is not candidate node that is able or permitted to process the request and provide the desired (e.g., requested) service to the client device.

In some embodiments, if there was a node identifier included with the request for the desired service, and the node identifier related to (e.g., indicated or requested) a particular local node or a specific remote node to process the request and perform the desired service (as opposed to, for example, requesting any remote node with connectivity), the candidate component 308 can determine whether the network address associated with the particular local node or specific remote node associated with the node identifier is part of the network address space associated with the client device (e.g., without having to analyze all of the other respective network addresses associated with the other respective nodes of the group of nodes). If the candidate component 308 determines that the network address associated with the particular local node or specific remote node is not part of (e.g., is not in) the network address space associated with the client device (e.g., 122), the NMC 132 can generate and present (e.g., via the communicator component 302) an error message (or notification message) to the service server (e.g., 128). The error message (or notification message) can indicate that the particular local node or specific remote node is not part of the network address space associated with the client device (e.g., 122), and thus, the particular local node or specific remote node is not able or permitted to process the request and provide the desired service to the client device.

With the group of candidate nodes (e.g., nodes 104, 106, 108, and 110) determined, the candidate component 308 also can determine which candidate nodes of the group of candidate nodes are available and can provide the desired service to the client device (e.g., 122). The NMC 132 (e.g., employing the status component 310), which can have knowledge and can be a source (e.g., centralized source) of knowledge regarding statuses and/or characteristics of the nodes of the cluster 102, can know which nodes (if any) of the cluster 102 are inactive (and unavailable as a result), have been deactivated (and are unavailable as a result), or have otherwise become unavailable for any reason, and, employing the monitor component 304, can monitor and track the respective operational statuses of the respective nodes and the respective services associated with (e.g., running on) the respective nodes, such as described herein. The NMC 132, employing the monitor component 304, the status component 310, and the data store 322, can store (e.g., cache) information (e.g., operational status and/or characteristic information) relating to the respective operational statuses and/or characteristics associated with the respective nodes and the respective services associated with the respective nodes in the data store 322, which can enable the candidate component 308 to cross-check the respective operational statuses associated with the respective nodes and/or the respective services with the candidate nodes of the group of candidate nodes (e.g., nodes 104, 106, 108, and 110) to filter out any candidate node(s) (if any) that is not running the desired service requested in the request associated with the client device (e.g., 122).

The candidate component 308 can analyze the information relating to the respective operational statuses and/or characteristics associated with the respective nodes and the respective services associated with the respective nodes in the data store 322. Based at least in part on the results of such analysis, the candidate component 308 can determine which candidate nodes of the group of candidate nodes (e.g., nodes 104, 106, 108, and 110) are available and can provide the desired service requested in the request associated with the client device (e.g., 122), and can include such available candidate nodes in a group of available candidate nodes, and also can filter out any candidate node that is not available or is not able to provide the desired service requested in the request. If, for example, based at least in part on the results of such analysis, the candidate component 308 determines that candidate nodes 104, 106, and 108 of the group of candidate nodes (e.g., nodes 104, 106, 108, and 110) are available and can provide the desired service and determines that candidate node 110 is unavailable or is not able to provide the desired service, the candidate component 308 can include candidate nodes 104, 106, and 108 in the group of available candidate nodes and can filter out candidate node 110, removing candidate node 110 from further consideration with regard to the request associated with the client device (e.g., 122).

With the NMC 132 having determined a group of network addresses associated with a group of available candidate nodes that are available and able to provide the desired service requested in the request associated with the client device (e.g., 122), to facilitate enhancing (e.g., improving or optimizing) the outcome of the request (e.g., processing of the request and performance of the service relating thereto), the NMC 132, employing the service performance component 312 can determine and/or select, from the group of available candidate nodes (e.g., 104, 106, and 108), a desired (e.g., suitable, useful, best, or optimal) network address(es) and associated available candidate node(s) that can be utilized to process the request and perform the desired service and/or can determine a ranked list or order of respective network addresses associated with respective available candidate nodes of the group of available candidate nodes (e.g., 104, 106, and 108) for consideration by the service server (e.g., 128) and/or client device (e.g., 122) or associated client to process the request and perform the desired service, based at least in part on defined service performance criteria and/or a preference (e.g., one or more user or client preferences) associated with the client device (e.g., 122) and/or associated client. The service performance component 312 can consider, apply, or evaluate one or more characteristics (e.g., attributes, factors, or properties) of a group of characteristics relating to service performance to facilitate determining and/or selecting a desired network address(es) and associated available candidate node(s), and/or determining the ranked list or order of respective network addresses associated with respective available candidate nodes, in accordance with the defined service performance criteria and/or the preference associated with the client device (e.g., 122) and/or associated client.

The group of characteristics can comprise or relate to, for example, bandwidth (e.g., increased bandwidth), safe failover, load balancing across nodes (e.g., available candidate nodes), a speed associated with an interface(s) associated with a network or an available candidate node, or another desired characteristic, or a desired combination of the characteristics. If the desired outcome associated with processing the request is increased bandwidth, the service performance component 312 can apply a "many from one" policy, which can mean that the returned network addresses (e.g., all of the returned network addresses) can be configured on a single node (e.g., a single available candidate node), so that the client device (e.g., 122) can create multiple communication connections to the same node to multiply, increase, or enhance the potential data throughput with regard to the service. To facilitate achieving increased bandwidth, the service performance component 312 can identify and select, or can rank higher on the list or ranked ordering of network addresses, the network addresses that are associated with a single available candidate node that is determined (e.g., by the NMC 132) to have a higher bandwidth over other network addresses associated with another single available candidate node that is determined (e.g., by the NMC 132) to have a relatively lower bandwidth, in accordance with the defined service performance criteria.

If the desired outcome associated with processing the request is safe failover, the service performance component 312 can follow and apply a "one from many" policy, which can mean that each returned network address can be configured on a different available candidate node so that the client device (e.g., 122) can reconnect to another available candidate node if its communication connection to an available candidate node has been lost or terminated. To facilitate achieving a desired safe failover, the service performance component 312 can identify and select, or can rank higher on the list or ranked ordering of network addresses, the respective network addresses that are associated with respective available candidate nodes over multiple network addresses associated with the same available candidate node, in accordance with the defined service performance criteria.

If the desired outcome associated with processing the request is load balancing across the nodes (e.g., available candidate nodes), the service performance component 312 can place or rank network addresses associated with the least loaded available candidate node (e.g., the available candidate node handling the lowest amount or level of load) over (e.g., higher than) other network addresses associated with higher loaded available candidate nodes in the list or ranked order of network addresses associated with available candidate nodes, in accordance with the defined service performance criteria. For example, if, based at least in part on analysis of information relating to respective loads associated with respective available candidate nodes, the service performance component 312 determines that a first load associated with a first available candidate node (e.g., 104) is lower (e.g., lower amount or level) than a second load associated with a second available candidate node (e.g., 106) that is lower a third load associated with a third available candidate node (e.g., 108), the service performance component 312 can identify and select, or can rank higher on the list or ranked ordering of network addresses, a first network address(es) associated with the first available candidate node (e.g., 104) over a second network address(es) associated with the second available candidate node (e.g., 106) and a third network address(es) associated with the third available candidate node (e.g., 108), and/or can identify and select, or can rank higher on the list or ranked ordering of network addresses, the second network address(es) associated with the second available candidate node (e.g., 106) over the third network address(es) associated with the third available candidate node (e.g., 108), in accordance with the defined service performance criteria.

If the desired outcome associated with processing the request is speed associated with an interface within a certain range associated with an available candidate node, the NMC 132 can have knowledge and information regarding the respective configured interfaces associated with the respective networks (e.g., 116, 118, and/or 120) and the respective nodes, and the service performance component 312 can consider, and place or rank, network addresses associated with one or more of the available candidate nodes (e.g., 104, 106, and/or 108) that are configured on interfaces that are determined to satisfy (e.g., to meet or be within) the desired certain range of speeds of interfaces and can filter out and remove from consideration any network address(es) associated with an available candidate node that is configured on an interface(s) that is determined to not satisfy (e.g., to not meet or not be within) the desired certain range of speeds of interfaces, in accordance with the defined service performance criteria. For example, if the certain range of speed of an interface is within a minimum threshold speed of an interface and a maximum threshold speed of an interface, and, as determined by the service performance component 312 based at least in part on information relating to respective speeds of respective interfaces associated with the respective networks and the respective available candidate nodes, a first network address is associated with a first interface associated with a first available candidate node (e.g., 104) that is determined to have a first speed between the minimum threshold speed and the maximum threshold speed, and a second network address is associated with a second interface associated with a second available candidate node (e.g., 106) that has a second speed that is determined to be lower than the minimum threshold speed or higher than the maximum threshold speed, the service performance component 312 can consider, and place or rank, the first network address associated with the first available candidate node (e.g., 104) on the list or ranked order of network addresses associated with available candidate nodes and can filter out (e.g., keep off the list or ranked order of network addresses) and remove from consideration the second network address associated with the second available candidate node (e.g., 106), in accordance with the defined service performance criteria.

In some embodiments, the service performance criteria and/or the preference associated with the client device (e.g., 122) or associated client can indicate or specify that a combination of characteristics are to be considered and applied to facilitate determining and selecting network addresses (e.g., one or more best or most favorable network addresses), or determining a list or ranked ordering of network addresses, associated with the group of available candidate nodes (e.g., 104, 106, and 108) that can be used to process the request and perform the desired service. As an example, the service performance criteria and/or the preference can indicate or specify that network addresses associated with the available candidate nodes can qualify to be on the list or ranked order of network addresses if the network addresses are associated with an available candidate node that has a load level that satisfies (e.g., is less than or equal to) a defined threshold maximum load level, and, with regard to network addresses that can qualify to be on the list or ranked order, network addresses associated with a node that can facilitate providing increased amount of bandwidth are to be ranked higher on the list or ranked order of network addresses than other network addresses that are associated with another node that has a relatively lower amount of bandwidth, in accordance with the defined service performance criteria and/or the preference. The service performance component 312 can apply the combination load balancing and bandwidth factors, in accordance with the service performance criteria and/or the preference, to determine and select network addresses and/or determine the list or ranked order of network addresses associated with the available candidate nodes.

As another example, the service performance criteria and/or the preference can indicate or specify that network addresses associated with the available candidate nodes can qualify to be on the list or ranked order of network addresses if the network addresses are associated with an interface associated with an available candidate node that has a speed that satisfies (e.g., is within) a defined threshold range of speeds of interfaces (e.g., between the minimum threshold speed and the maximum threshold speed), and, with regard to network addresses that can qualify to be on the list or ranked order, a network address associated with an available candidate node that has a lower load level is to be ranked higher on the list or ranked order of network addresses than other network addresses that are associated with an available candidate node(s) that has a relatively higher load level, in accordance with the defined service performance criteria and/or the preference. The service performance component 312 can apply the combination of factors relating to speed of an interface and load balancing, in accordance with the service performance criteria and/or the preference, to determine and select network addresses and/or determine the list or ranked order of network addresses associated with the available candidate nodes.

In some embodiments, the service performance component 312 can operate in conjunction with the ranking component 314 to determine the ranking (e.g., ranking from best or highest to worst or lowest) of respective network addresses associated with respective available candidate nodes of the group of available candidate nodes (e.g., 104, 106, and 108) based at least in part on, and in accordance with, one or more characteristics of the group of characteristics, the defined service performance criteria, and/or the preference (if any) associated with the client device (e.g., 122) and associated client.

In certain embodiments, the service performance component 312 can operate in conjunction with the weight component 316 to apply respective desired weights (e.g., weight values) to respective characteristics of the group of characteristics based at least in part on the respective significance or importance of the respective characteristics (e.g., to the client, operator or manager of the cluster of nodes 102, or another entity), in accordance with (e.g., as determined using) the defined service performance criteria and/or a preference associated with the client device (e.g., 122) or associated client, wherein the defined service performance criteria can comprise, or can be based at least in part on, an entity preference of an operator or manager of the cluster 102 or another entity. For example, if a first characteristic (e.g., load balancing or other first characteristic) is determined to be more significant or important (e.g., to the client, cluster operator or manager, or other entity) than a second characteristic (e.g., bandwidth or other second characteristic), the weight component 316 can apply a first weight value to the first characteristic that can be higher than a second weight value the weight component 316 can apply to the second characteristic to facilitate giving more (e.g., higher) weight to the first characteristic over the second characteristic when determining the respective rankings of the respective network addresses associated with the respective available candidate nodes to reflect or account for the relatively higher significance or importance of the first characteristic as compared to the second characteristic. The service performance component 312 can determine respective ranking scores associated with the respective network addresses associated with the respective available candidate nodes (e.g., 104, 106, and 108), and, accordingly, can determine the ranked list or ordering of the respective network addresses associated with the respective available candidate nodes, based at least in part on the results of the analysis of information relating to the available candidate nodes and the group of characteristics (e.g., including the first weight value applied to the first characteristic and the second weight value applied to the second characteristic).

Accordingly, with the respective weighting of the first and second characteristics, a first network address that has a more favorable quality with regard to the first characteristic typically can have a ranking (and a ranking score) that can be relatively higher than it otherwise would have been without the application of the first weight value to the first characteristic and/or typically can have a higher ranking (and a higher ranking score) than a second network address that has a more favorable quality with regard to the second characteristic with the second weight value applied thereto (e.g., assuming that other characteristics associated with those network addresses are equal or substantially the same, and providing that, for the first network address, the relative quality with regard to the second characteristic is not so poor that it lowers the ranking score of the first network address such that it more than counters or negates the increase in ranking score as a result of the first weight applied to the first characteristic).

With further regard to the preference, the preference (if any) associated with the client device (e.g., 122) and/or associated client can indicate which characteristic(s) of the one or more characteristics is or are desired (e.g., preferred or wanted) to be given preference or more weight over the other characteristics and/or can rank the characteristics in order of significance or importance to the client. In some embodiments, the preference(s) also can indicate or specify a threshold value(s) (e.g., minimum threshold value, maximum threshold value, or range of values between minimum and maximum threshold values) associated with a characteristic(s) (e.g., minimum threshold amount of bandwidth, maximum threshold amount of load to indicate a node is handling a high load, or a speed of an interface between a lower or minimum threshold speed and a higher or maximum threshold speed).

Having determined the one or more desirable network addresses and/or determined a desirable ranked list or order of network addresses (e.g., in accordance with the defined service performance criteria and/or client preference) that can process the request for the desired service and provide the desired service to the client device (e.g., 122) and associated client, in some embodiments, the NMC 132 can select one or more of those network addresses (e.g., one or more of the best, most favorable, or highest or higher ranked network addresses) associated with one or more of the respective available candidate nodes for use by the client device to connect to the one or more respective available candidate nodes where the one or more nodes can process the client request and perform the desired service, or, in other embodiments, the NMC 132 can generate the ranked list or order of the respective network addresses associated with the one or more respective available candidate nodes for presentation to the service server and/or client device to facilitate selection of one or more desired network addresses from the ranked list or order by the service server or client device (e.g., in accordance with the defined service performance criteria and/or client preference). The NMC 132, employing the communicator component 302, can communicate or present information relating to the one or more selected network addresses (if any have been selected by the NMC) associated with the one or more respective available candidate nodes and/or the ranked list or order of the respective network addresses associated with the one or more respective available candidate nodes to the service server (e.g., 128 or 130).

In some embodiments, after receiving such information from the NMC 132, the service server (e.g., 128 or 130) can select one or more desired network addresses (e.g., the highest ranked network address or a desired number of the higher ranked network addresses) from the ranked list or order of network addresses (e.g., if the NMC did not select one or more network addresses), based at least in part on the respective rankings of the respective network addresses associated with the one or more respective available candidate nodes, in accordance with the defined service performance criteria and/or client preference. In such embodiments, the service server can have the client device use the one or more selected network addresses (e.g., as selected by the service server) to connect to the network via one or more communication connections associated with one or more interfaces (e.g., that are associated with the one or more network addresses) associated with the one or more available candidate nodes, wherein the one or more available candidate nodes can process the client request and perform the service. In other embodiments (e.g., alternatively), after receiving such information from the NMC 132, the service server (e.g., 128 or 130) can communicate or present information relating to the one or more selected network addresses (if any have been selected by the NMC or service server) associated with the respective available candidate nodes and/or the ranked list or order of the respective network addresses associated with the respective available candidate nodes to the client device (e.g., 122). After receiving such information, the client device or associated client can utilize the one or more selected network addresses (e.g., as selected by the NMC), or can select one or more desired network addresses (e.g., the highest ranked network address or a desired number of the higher ranked network addresses) from the ranked list or order of network addresses (e.g., in accordance with the defined service performance criteria and/or client preference). The client device can utilize the one or more network addresses (e.g., as selected by the NMC, client device, or client) to connect the client device to the one or more available candidate nodes (e.g., associated with the one or more network addresses). The one or more available candidate nodes can process the client request, perform the service, determine and/or generate request results (e.g., request results that can be responsive to the request), and/or provide (e.g., communicate, present, or display) the request results (e.g., result information relating to the request results) to the client device.

In certain embodiments, the NMC 132 can employ the operations manager component 318, which can facilitate generating instructions to have components of the NMC 132 perform operations, and can communicate respective instructions to respective components (e.g., communicator component 302, monitor component 304, network address space component 306, candidate component 308, . . . , processor component 320, and data store 322) of the NMC 132 to facilitate performance of operations by the respective components of the NMC 132 based at least in part on the instructions, in accordance with the defined service performance criteria and service performance algorithm(s) (e.g., service performance algorithms as disclosed, defined, recited, or indicated herein by the methods, systems, and techniques described herein). The operations manager component 318 also can facilitate controlling data flow between the respective components of the NMC 132 and controlling data flow between the NMC 132 and another component(s) or device(s) (e.g., node, service server, client device, network device, memory, file system, or other component or device) associated with (e.g., connected to) the NMC 132.

The processor component 320 can work in conjunction with the other components (e.g., communicator component 302, monitor component 304, network address space component 306, candidate component 308, . . . , operations manager component 318, and data store 322) to facilitate performing the various functions of the NMC 132. The processor component 320 can employ one or more processors, microprocessors, or controllers that can process data, such as information relating to nodes, cluster(s) of nodes, service servers, client devices, clients, client requests (e.g., client queries), preferences, services, characteristics, network addresses, network identifiers, node identifiers, files, file systems, hash values, metadata, parameters, traffic flows, policies, defined service performance criteria, algorithms (e.g., service performance algorithms, network management algorithms, hash algorithms, compression algorithms, decompression algorithms, and/or other algorithm), protocols, interfaces, tools, and/or other information, to facilitate operation of the NMC 132, as more fully disclosed herein, and control data flow between the NMC 132 and other components (e.g., node, service server, client device, network device, memory, file system, or other component or device) associated with the NMC 132.

The data store 322 can store data structures (e.g., user data, metadata), code structure(s) (e.g., modules, objects, hashes, classes, procedures) or instructions, information relating to nodes, cluster(s) of nodes, service servers, client devices, clients, client requests (e.g., client queries), preferences, services, characteristics, network addresses, network identifiers, node identifiers, files, file systems, hash values, metadata, parameters, traffic flows, policies, defined service performance criteria, algorithms (e.g., service performance algorithms, network management algorithms, hash algorithms, compression algorithms, decompression algorithms, and/or other algorithm), protocols, interfaces, tools, and/or other information, to facilitate controlling operations associated with the NMC 132. In an aspect, the processor component 320 can be functionally coupled (e.g., through a memory bus) to the data store 322 in order to store and retrieve information desired to operate and/or confer functionality, at least in part, to the communicator component 302, monitor component 304, network address space component 306, candidate component 308, status component 310, service performance component 312, ranking component 314, weight component 316, operations manager component 318, data store 322, or other component, and/or substantially any other operational aspects of the NMC 132.

The disclosed subject matter, by employing the NMC 132 and the associated techniques and algorithms to process client requests, and determine, select, and/or rank network addresses associated with nodes (e.g., qualifying or available candidate nodes), in accordance with the defined service performance criteria and/or client preference), such as described herein, can provide enhanced performance in processing of client requests for services and providing services to clients, as compared to existing techniques for processing client requests for services and providing services to clients. Many existing techniques for processing client requests and providing services to clients typically can merely rely on fetching local IP addresses in response to a client request for a service without employing any further effort or taking further action to determine which network addresses and associated nodes are best suited to process the client request and provide the requested service. Further, many existing techniques for processing client requests and providing services to clients can be undesirably deficient in handling (e.g., processing), or can be unable to handle, client requests for services and providing such services when there are multi-tenant (e.g., multi-client), multi-node networks on a same cluster of nodes. The disclosed subject matter, by employing the NMC 132 and the associated techniques and algorithms to process client requests, and determine, select, and/or rank network addresses associated with nodes (e.g., qualifying or available candidate nodes), in accordance with the defined service performance criteria and/or client preference), such as described herein, can desirably (e.g., suitably, favorably, enhancedly, or optimally) determine which network addresses and associated nodes (e.g., qualifying or available candidate nodes) are best suited to process a client request for a service and provide the requested service and can desirably (e.g., suitably, favorably, enhancedly, or optimally) handle and manage client requests for services and providing such services when there are multi-tenant (e.g., multi-client), multi-node networks on a same cluster of nodes (e.g., cluster 102).

Figure 4:
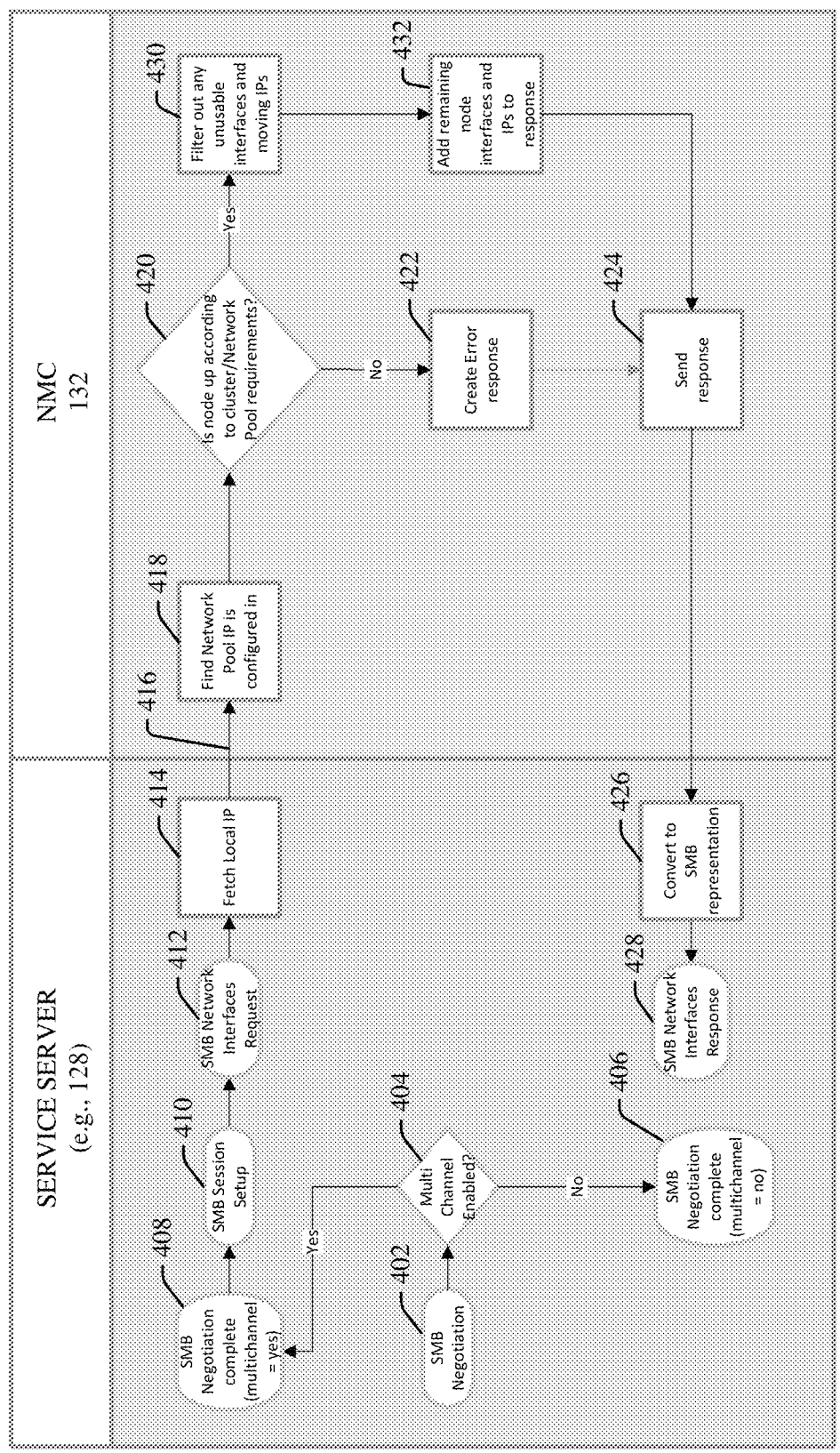
FIG. 4 illustrates a block diagram of an example process flow that can be utilized to manage a client request for a service that can be received from a service server that can be a server message block (SMB) service server, in accordance with various aspects and embodiments of the disclosed subject matter.

Turning to FIG. 4 (along with FIGS. 1, 2, and 3), FIG. 4 illustrates a block diagram of an example process flow 400 that can be utilized to manage a client request for a service that can be received from a service server that can be an SMB service server (e.g., SMB multichannel service server), in accordance with various aspects and embodiments of the disclosed subject matter. As indicated at reference numeral 402 of the example process flow 400, in connection with a request (e.g., query) received by a service server (e.g., 128) from a client device (e.g., 122), the client device and the service server can engage in (e.g., perform) an SMB negotiation. The request can be in connection with an instance where the client device can be requesting (e.g., optionally requesting) an SMB session be set up and requesting (e.g., optionally requesting) network interfaces in connection with requesting the desired service. In this embodiment, the service server can be or can comprise an SMB service server. As indicated at reference numeral 404 of the example process flow 400, the service server (e.g., 128) can determine whether multichannel is enabled. If multichannel is enabled for use by the client device, service server, and node (e.g., 104), multiple communication connections (e.g., network communication connections) can be established between the client device and the node, which can enable higher data communication speeds, higher data throughput, or otherwise enhanced communication of data in connection with the service. If multichannel is not enabled, only one communication connection can be established between the client device and the node.

If, at reference numeral 404, the service server determines that multichannel is not enabled, as indicated at reference numeral 406 of the example process flow 400, the SMB negotiation associated with the client request can be complete, wherein the SMB negotiation result can indicate that multichannel is not enabled.

If, instead, at reference numeral 404, the service server determines that multichannel is enabled, as indicated at reference numeral 408 of the example process flow 400, the SMB negotiation associated with the client request can be complete, wherein such SMB negotiation result can indicate that multichannel is enabled. As indicated at reference numeral 410 of the example process flow 400, the client device (e.g., 122) can request (e.g., can optionally request) that an SMB session be set up, and, if the client device makes such a request, in response, the service server (e.g., 128) can set up (e.g., establish or create) an SMB session for the client device (e.g., 122). As indicated at reference numeral 412 of the example process flow 400, in connection with the SMB session, the client device (e.g., 122) also can request (e.g., can optionally request) network interfaces (e.g., available and suitable network interfaces) that can process the client request and provide the desired service, and the service server (e.g., 128) can generate a network interfaces request (e.g., that can be sent to the NMC 132) that can request network interfaces.

If the client device makes the request for network interfaces, in response to such request, as indicated at reference numeral 414 of the example process flow 400, the service server (e.g., 128) can fetch (e.g., retrieve or obtain) a local IP address associated with the client device (e.g., the local IP address with which the client device is connected) from information, such as, for example, the network identifier, associated with the client request or from a data store. As indicated at reference numeral 416 of the example process flow 400, the service server can communicate information relating to the client request, including the local IP address, to the NMC 132.

As indicated at reference numeral 418 of the example process flow 400, the NMC 132 can find a network pool in which the IP address is configured based at least in part on the IP address, wherein the network pool can be, for example, an IP network comprising a group (e.g., a set) of IP addresses that can be associated with a group of nodes. For instance, the NMC 132 can determine the configured IP address space associated with the IP address (e.g., local IP address) associated with the client request and the connection associated with the client device, based at least in part on an analysis of the IP address (e.g., local IP address), such as more fully described herein.

As indicated at reference numeral 420 of the example process flow 400, the NMC 132 can determine whether the node is up and running according to cluster and network pool (e.g., IP network) specifications or requirements, based at least in part on the results of analyzing request-related information relating to the client request, including the service type of the requested service, the IP address space associated with the IP address associated with the client device (e.g., the local IP address with which the client device is connected), network addresses associated with node, and information relating to the operational status of the node and associated services, in accordance with the defined service performance criteria, such as more fully described herein. For instance, the NMC 132 can determine whether there is one or more IP addresses associated with the node that is in the IP address space associated with the client device. Given that the service server of the node has made the request for the network interfaces, the node, of course, can be up and running, with the service running on the node, at that time. However, the NMC 132 can determine whether or not the node is about to be taken offline or deactivated and/or whether an IP address (e.g., an IP address in the IP address space) is about to be moved, to facilitate determining whether there are one or more IP addresses associated with one or more interfaces of the node that can be utilized to process the request and provide the desired service.

If none of the IP addresses associated with the node are in the IP address space associated with the client device, the NMC 132 can determine that the node cannot be a candidate node that can handle, or at least potentially can handle, the client request, and can create (e.g., generate) an error response (e.g., error message), as indicated at reference numeral 422 of the example process flow 400, such as more fully described herein. The error message can indicate that there the node is not available or able to process the client request for the service.

If, at reference numeral 420, the NMC 132 determines that there is one or more IP addresses associated with the node is in the IP address space associated with the client device, the NMC 132 can determine whether the node is available and can provide the requested service, based at least in part on the results of analyzing the information relating to the respective operational statuses of the node and services associated with the node, in accordance with the defined service performance criteria, such as more fully described herein. If the NMC 132 determines that the node (e.g., candidate node) is not available and/or the node is not able to provide the requested service, the NMC 132 can determine that the node is not an available candidate node that can process the client request and perform the requested service, and can create an error response (e.g., error message), as indicated at reference numeral 422, such as more fully described herein. The error message can indicate that the node (and accordingly, the interface(s) and IP address(es) associated with that node) is not available or able to process the client request and provide the requested service.

As indicated at reference numeral 424 of the example process flow 400, the NMC 132 can send (e.g., communicate or present) the error response to the service server. As indicated at reference numeral 426 of the example process flow 400, the service server can convert the information contained in the error response to an SMB representation, in accordance with a desired SMB format and protocol. As indicated at reference numeral 428 of the example process flow 400, the service server can generate and provide an SMB network interfaces response to the client request, based at least in part on (e.g., corresponding to) the error message, wherein, in this instance, the SMB network interfaces response can indicate that the node (and accordingly, the interface(s) and IP address(es) associated with that node) is not available to process the client request and provide the requested service.

Referring again to reference numeral 420, if, instead, it is determined that one or more IP addresses associated with the node, and the (candidate) node is available to process the request and can perform the requested service (e.g., the node is an available candidate node), as indicated at reference numeral 430 of the example process flow 400, the NMC 132 can filter out any unusable interfaces (if any) from the interfaces associated with the node and any moving IP addresses (if any) associated with the node, in accordance with the defined service performance criteria. For instance, if the speed of an interface associated with a network and the node does not satisfy the defined service performance criteria (e.g., if a speed of an interface is not within a defined threshold range of speeds), the NMC 132 can filter out that interface from consideration with regard to processing of the client request for the service. As another example, if the NMC 132 determines that an IP address associated with the node is moving or going to be moving, the NMC 132 can filter out that IP address associated with the node from further consideration with regard to processing of the client request for the service.

As indicated at reference numeral 432 of the example process flow 400, the NMC 132 can add information relating to the one or more remaining interfaces associated with the (available candidate) node and one or more remaining IP addresses associated with the node to a response (e.g., response message, in response to the client request). For instance, the NMC 132 can generate a response message that can comprise the information relating to the one or more remaining interfaces and the one or more remaining IP addresses associated with the node. In some embodiments, the NMC 132 also can determine and select one or more desirable IP addresses associated with the node, or can determine a ranked list or order of IP addresses associated with the node, based at least in part on analysis of one or more characteristics of the group of characteristics (e.g., bandwidth, safe failover, load balancing, speeds of interfaces, and/or another desired characteristic) associated with the node and/or a preference associated with the client, in accordance with the defined service performance criteria, such as more fully described herein. The NMC 132 can include information relating to the one or more selected desirable IP addresses associated with the node (e.g., one or more interfaces of the network associated with the node), or the ranked list or order of IP addresses (e.g., remaining IP addresses) associated with the node, in the response message.

As indicated at reference numeral 424, the NMC 132 can communicate the response message (e.g., response created at reference numeral 432) to the service server. As indicated at reference numeral 426 of the example process flow 400, the service server can convert the information (e.g., information relating to the one or more IP addresses and interfaces associated with the network) contained in the response message to an SMB representation, in accordance with a desired SMB format and protocol. As indicated at reference numeral 428, the service server can generate and provide an SMB network interfaces response to the client request, based at least in part on (e.g., corresponding to) the response message (e.g., the response created at reference numeral 432, and sent to the service server at reference numeral 424), wherein, in this instance, the SMB network interfaces response can comprise information relating to the one or more selected desirable IP addresses associated with the (available candidate) node (e.g., one or more interfaces of the network associated with the node), or the ranked list or order of IP addresses (e.g., remaining IP addresses) associated with the node, wherein one or more of those IP addresses (e.g., the highest ranked IP address or a desired number of the higher ranked IP addresses) can be utilized by the client device to connect to one or more interfaces of the network to enable the node to process the client request and provide the requested service.

Figure 5:
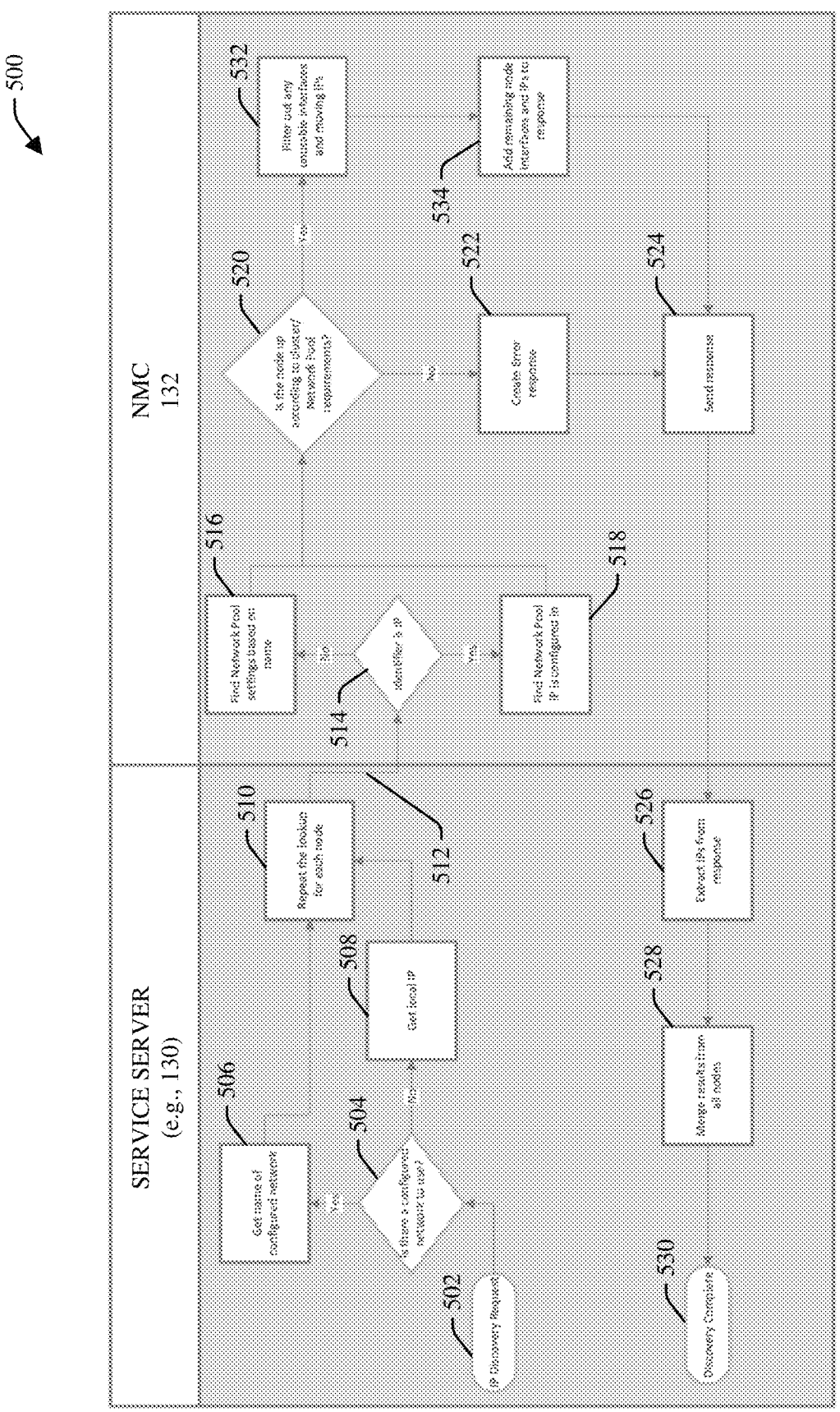
FIG. 5 depicts a block diagram of an example process flow that can be employed to manage a client request for a service that can be received from a service server that can employ a data mover service, in accordance with various aspects and embodiments of the disclosed subject matter.

Turning to FIG. 5 (along with FIGS. 1, 2, and 3), FIG. 5 depicts a block diagram of an example process flow 500 that can be employed to manage a client request for a service that can be received from a service server that can employ a data mover service, in accordance with various aspects and embodiments of the disclosed subject matter. As indicated at reference numeral 502 of the example process flow 500, a service server (e.g., 130) can receive an IP discovery request, as part of a client request to request a desired service, from a client device (e.g., 122) associated with a client. In some embodiments, the service server can employ and provide a data mover service, such as more fully described herein.

As indicated at reference numeral 504 of the example process flow 500, the service server (e.g., 130) can determine whether there is a configured network (e.g., configured node network) to use to process the request and provide the requested service based at least in part on analysis of information of or associated with the client request, an IP address or other identifier associated with the client device, or other information available to the service server. If the service server determines that there is a configured network to use to process the request and provide the requested service, the service server can get (e.g., obtain or retrieve) the name of the configured network (e.g., from a data store), as indicated at reference numeral 506 of the example process flow 500. If, instead, the service server determines that there is no configured network to use to process the request and provide the requested service, the service server can get (e.g., obtain or retrieve) a local IP address that can be associated with the client device (e.g., the local IP address with which the client device is connected) from information, such as, for example the network identifier, associated with the client request or from a data store, as indicated at reference numeral 508 of the example process flow 500.

As indicated at reference numeral 510 of the example process flow 500, the service server can repeat the lookup of the name of the configured node network or the local IP address for each node of the group of nodes of the node cluster (e.g., 102). In some embodiments (e.g., in accordance with the depiction in FIG. 5), the service server can contact each node of the group of nodes individually, and the service server can repeat the lookup of the name of the configured node network or the local IP address with regard to each node of the group of nodes of the node cluster, and can communicate the name of the configured node network or the local IP address, along with the other request-related information associated with the request, to each of the NMCs of each of those nodes.

In other embodiments, the service server can communicate the name of the configured node network or the local IP address, along with the other request-related information associated with the request, to an NMC of one of the nodes. In certain embodiments, the NMC can perform the NMC-related operations of the example process flow 500 (e.g., on behalf of itself and other NMCs of other nodes), such as described herein, as the NMCs of the nodes can be synchronized with each other with regard to information relating to, for example, respective network addresses, respective interfaces, and respective operational statuses of nodes and services.

In certain other embodiments, alternatively, the NMC of the node can coordinate and share (e.g., communicate) request-related information, including the name of the configured node network or the local IP address, with other NMCs of the other nodes. The respective NMCs of the respective nodes can perform the NMC-related operations of the example process flow 500, such as described herein. The other NMCs of the other nodes can communicate respective responses relating to respective network addresses and interfaces to the NMC of the node, and that NMC can generate an overall response (e.g., overall response message) relating to the respective network addresses and interfaces associated with the respective nodes, which can be provided (e.g., communicated) to the service server, such as more fully described herein.

As indicated at reference numeral 512 of the example process flow 500, the service server can communicate information relating to the client request, including the network identifier (e.g., name of the configured network, local IP address, or VLAN tag) and/or a node identifier relating to a node(s), to the NMC 132. In some embodiments, the NMC 132 can be associated with an intelligent connection module that can facilitate managing communication connections to nodes of a cluster of nodes, including balancing connection loads associated with nodes and handling connection failover associated with connections with nodes.

As indicated at reference numeral 514 of the example process flow 500, the NMC 132 can determine whether the network identifier is an IP address, based at least in part on the results of the analysis of the information relating to the client request, including the network identifier. If the NMC 132 determines that the network identifier is not an IP address, but is instead, for example, a name of a configured network of nodes, as indicated at reference numeral 516 of the example process flow 500, the NMC 132 can find (e.g., identify, locate, or determine) a network pool (e.g., IP network) in which the IP address is configured based at least in part on analysis of the name of the configured network of nodes and/or other information (e.g., identifying or mapping information) relating to configured networks of nodes. For example, the NMC 132 can determine the configured IP address space associated with the IP address associated with the client request and client device based at least in part on the results of the analysis of the name of the configured network of nodes and/or the other information relating to configured networks of nodes, such as described herein.

If, instead, at reference numeral 514, the NMC 132 determines that the network identifier is an IP address, the NMC 132 can find (e.g., identify, locate, or determine) a network pool (e.g., IP network) in which the IP address is configured based at least in part on analysis of the IP address (e.g., local IP address) and/or the other information relating to configured networks of nodes, as indicated at reference numeral 518 of the example process flow 500. For example, the NMC 132 can determine the configured IP address space associated with the IP address (e.g., local IP address) associated with the client request and client device, based at least in part on analysis of the IP address and/or the other information relating to configured networks of nodes, such as more fully described herein.

As indicated at reference numeral 520 of the example process flow 500, the NMC 132 can determine whether the node(s) is up and running according to cluster and network pool specifications or requirements, based at least in part on the results of analyzing request-related information relating to the client request, including the service type of the requested service, the IP address space associated with the IP address associated with the client device (e.g., the local IP address with which the client device is connected), respective network addresses associated with respective nodes associated with the cluster (e.g., 102), and information relating to the respective operational statuses of the respective nodes and respective services associated with the respective nodes, in accordance with the defined service performance criteria, such as more fully described herein. For instance, the NMC 132 can determine whether there is one or more IP addresses associated with the node (e.g., with regard to each of the one or more candidate nodes of the group of nodes) that is in the IP address space associated with the client device. If a particular node was requested in the client request, the NMC 132 can determine whether the particular IP address(es) associated with the particular node is in the IP address space associated with the client device.

If no IP address(es) associated with the node is in the IP address space associated with the client device (e.g., 122), or if the particular network address(es) associated with the particular node (if any) requested by the client device is not in the IP address space, the NMC 132 can determine that the node (or particular node (if any)) is not suitable to be a candidate node that can handle, or at least potentially can handle, the client request, and can create (e.g., generate) an error response (e.g., error message), as indicated at reference numeral 522 of the example process flow 500, such as described herein. If the NMC 132 is evaluating the nodes as a group and merging the results (instead of the service server merging the results), the NMC 132 can evaluate the nodes of the group of nodes, and if the NMC 132 determines that no IP addresses associated with the nodes are in the IP address space associated with the client device (e.g., 122), the NMC 132 can determine that no node of the group of nodes can be a candidate node that can handle, or at least potentially can handle, the client request, and can create an error response. The error message can indicate that the node is not available or able, or the requested particular node is not available or able, to process the client request for the service, or, if the NMC 132 is merging the results with regard to the nodes of the group of nodes, the error response can indicate that no node of the group of nodes is available or able to process the client request for the service.

If, at reference numeral 520, the NMC 132 determines that there is one or more IP addresses associated with a candidate node (e.g., for each of the one or more candidate nodes) that is in the IP address space associated with the client device, the NMC 132 can determine whether the candidate node (e.g., for each of the one or more candidate nodes) is available and can provide the requested service, based at least in part on the results of analyzing the information relating to the respective operational statuses of the respective candidate nodes and respective services associated with the respective candidate nodes, in accordance with the defined service performance criteria, such as more fully described herein. If the NMC 132 determines that the candidate node is not available and/or the candidate node is not able to provide the requested service, the NMC 132 can determine that the candidate node is not available to be an available candidate node that can process the client request and perform the requested service, and can create an error response (e.g., error message), as indicated at reference numeral 522, such as more fully described herein. If the NMC 132 is evaluating the candidate nodes as a group and merging the results (instead of the service server merging the results), the NMC 132 can evaluate the candidate nodes of the group of candidate nodes, and if the NMC 132 determines that no candidate node of the group of candidate nodes is available and/or able to provide the requested service, the NMC 132 can determine that no node of the group of candidate nodes can be an available candidate node that can handle, or at least potentially can handle, the client request, and can create an error response. The error message can indicate that the node is not available or able to process the client request and provide the requested service, or, if the error message relates to merged results, the error message can indicate that there is no node available or able to process the client request and provide the requested service.

As indicated at reference numeral 524 of the example process flow 500, the NMC 132 can communicate the error response(s) to the service server. In some embodiments, if all of the response messages received from all of the nodes are error messages that indicate the nodes are not in the IP address space and/or are not available or able to process the client request and provide the requested service, or if the error response received from the NMC 132 is an error response comprising merged results that indicate that the nodes are not in the IP address space and/or are not available or able to process the client request and provide the requested service, the example process flow 500 can bypass reference numeral 526 and reference numeral 528 of the example process flow 500, as the error response(s) can contain no IP address because it was determined that no node was available and able to process the client request and provide the requested service, and, as indicated at reference numeral 530 of the example process flow 500, the IP discovery associated with the client request can be complete.

Referring again to reference numeral 520, if, instead, it is determined that one or more IP addresses associated with one or more nodes of the group of nodes, or the particular network address(es) associated with the requested particular node, is in the IP address space associated with the client device, and one or more of the (candidate) nodes (which can be the particular (candidate) node, if requested) is available to process the request and can perform the requested service, as indicated at reference numeral 532 of the example process flow 500, with regard to each available candidate node, the NMC 132 (e.g., the NMC(s) of or associated with each of the one or more available candidate nodes) can filter out any unusable interfaces (if any) from the interfaces associated with each of those one or more nodes and any moving IP addresses (if any) associated with each of those one or more nodes, in accordance with the defined service performance criteria. For instance, if a speed of an interface associated with a node does not satisfy the defined service performance criteria (e.g., if the speed of the interface is not within the defined threshold range of speeds), the NMC 132 can filter out that interface from consideration with regard to processing of the client request for the service. As another example, if the NMC 132 determines that an IP address associated with a node is moving or going to be moving, the NMC 132 can filter out that IP associated with that node from further consideration with regard to processing of the client request for the service.

As indicated at reference numeral 534 of the example process flow 500, the NMC 132 (e.g., the NMC(s) of or associated with each of the one or more available candidate nodes) can add information relating to the one or more remaining interfaces associated with the one or more available candidate nodes and one or more remaining IP addresses associated with the one or more available candidate nodes to a response (e.g., response message, in response to the client request). For instance, the NMC 132 (e.g., the NMC(s) of or associated with each of the one or more available candidate nodes) can generate a response message (e.g., for each available candidate node, or as merged results for the available candidate nodes) that can comprise the information relating to the one or more remaining interfaces and the one or more remaining IP addresses associated with each available candidate node (e.g., each available candidate node of the one or more available candidate nodes). In some embodiments, the NMC 132 also can determine and select one or more desirable IP addresses associated with one or more available candidate nodes, or can determine a ranked list or order of IP addresses associated with the one or more available candidate nodes, based at least in part on analysis of one or more characteristics of the group of characteristics (e.g., bandwidth, safe failover, load balancing, speeds of interfaces, and/or another desired characteristic) associated with the group of available candidate nodes and/or a preference associated with the client, in accordance with the defined service performance criteria, such as more fully described herein. The NMC 132 can include information relating to the one or more selected desirable IP addresses associated with one or more available candidate nodes, or the ranked list or order of IP addresses (e.g., remaining IP addresses) associated with the one or more available candidate nodes, in the response message.

As indicated at reference numeral 524, the NMC 132 can communicate the response message (e.g., response created at reference numeral 534) to the service server. As indicated at reference numeral 526, the service server can extract information relating to the one or more IP addresses from the response message, wherein the one or more IP addresses can be utilized by the client device (e.g., 122) to connect to the one or more available candidate nodes associated with the one or more IP addresses.

As indicated at reference numeral 528, the service server can merge the results from all of the nodes, and, as indicated at reference numeral 530, the IP discovery associated with the client request can be complete. In some embodiments (e.g., in accordance with the depiction in FIG. 5), with regard to the network of network addresses associated with the network address space, one or more respective NMCs of one or more of the respective available candidate nodes (e.g., nodes that the service server can communicate with) can communicate the respective results relating to respective network addresses to the service server, and the service server can merge the respective results to generate an overall result relating to the respective network addresses (e.g., selected network address(es), or ranked list or order of network addresses) that can be utilized by the client device to connect to one or more of the available candidate nodes. In other embodiments, an NMC of an available candidate node can receive respective results relating to respective network addresses from other NMCs of the other available candidate nodes, and the NMC can merge the respective results to generate an overall result relating to the respective network addresses (e.g., selected network address(es), or ranked list or order of network addresses) that can be utilized by the client device to connect to one or more of the available candidate nodes. The NMC can communicate the overall result (e.g., the merged results) to the service server for further consideration and use by the service server and/or client device.

Figure 6:
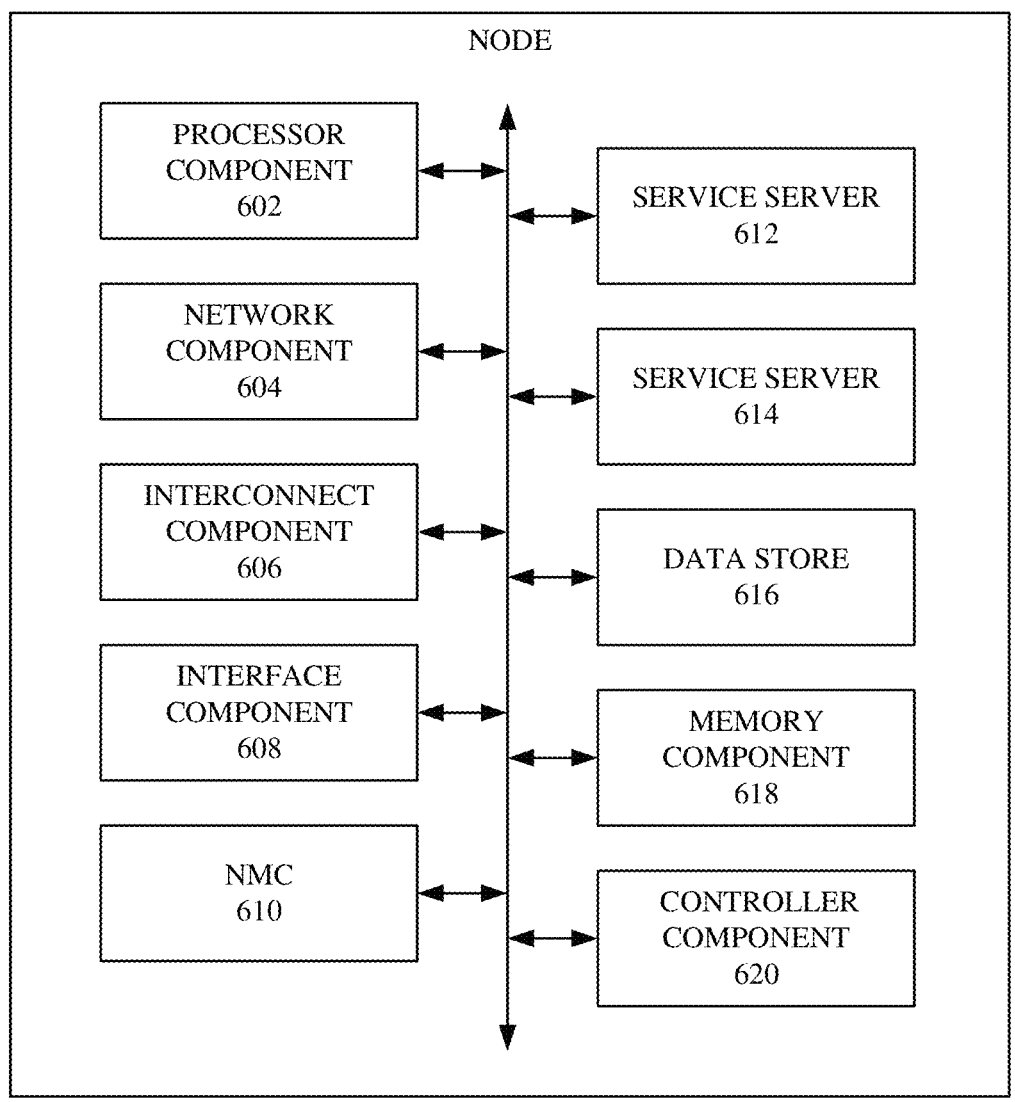
FIG. 6 depicts a block diagram of an example node, in accordance with various aspects and embodiments of the disclosed subject matter.

FIG. 6 depicts a block diagram of an example node 600, in accordance with various aspects and embodiments of the disclosed subject matter. The node 600 can be employed to store data, manage data, service client requests of clients, provide and perform services (e.g., in response to client requests), and/or perform other desired operations on data, such as described herein. The node 600 can comprise various components, including a processor component 602, a network component 604, an interconnect component 606, an interface component 608, an NMC 610, a service server 612 (e.g., an SMB-type service server), a service server 614 (e.g., a service server that can employ a data mover service), a data store 616, a memory component 618, a controller component 620, and/or other desired components. In some embodiments, the node 600 can be associated with the NMC 132.

The processor component 602 can include can work in conjunction with the other components (e.g., network component 604, interconnect component 606, interface component 608, an NMC 610, a service server 612, service server 614, data store 616, memory component 618, controller component 620, and/or another component) to facilitate performing the various functions of the node 600. The processor component 602 can employ one or more processors (e.g., one or more CPUs), microprocessors, or controllers that can process data, such as information relating to files, file systems, communication connection operations, read operations, write operations, data storage operations, data or file search operations, networking of network addresses, interfaces, and/or nodes, applications, services, requests, queries, metadata, parameters, traffic flows, policies, algorithms (e.g., service performance algorithms, network management algorithms, hash algorithms, compression algorithms, decompression algorithms), protocols, interfaces, tools, and/or other information, to facilitate operation of the node 600, and control data flow between the node 600 and other components (e.g., another node(s), NMC, client device, service server, file system, or other component) associated with the node 600.

The network component 604 can comprise network sub-components (e.g., Ethernet component (e.g., Ethernet ports and associated Ethernet sub-components), wireless communication connection component, or other network sub-component) that can enable the node 600 to network and communicate with one or more other nodes (e.g., nodes associated with a cluster), the NMC (e.g., NMC(s) of another node(s), client devices, service servers (e.g., service server(s) of another node(s)), and/or other components or devices. The network can employ IP for node-to-node communication between the node 600 and other nodes (e.g., other nodes associated with the cluster) associated with the node 600. For instance, a cluster of the storage system can comprise a back-end network, which can act as a backplane for the cluster, wherein can enable isolating node-to-node communication (e.g., between the node 600 and other nodes associated with the cluster) to a private, high-speed, low-latency network. The network component 604 can support and utilize desired network communication protocols to communicate with other components or devices in a communication network (e.g., Internet, intranet, customer network, or other type of communication network), wherein the network communication protocols can comprise, for example, network file system (NFS), server message block (SMB), hypertext transfer protocol (HTTP), file transfer protocol (FTP), Hadoop distributed file system (HDFS), OpenStack Swift, and/or other desired network communication protocols. The network component 604 also can comprise IP functionality that can allow the network component 604 and associated storage system to utilize communication protocols, such as IPv4 and IPv6, and be fully integrated with IPv4 and IPv6 environments. The node 600 can be associated with (e.g., assigned) respective IP addresses, including virtual IP addresses, that can be employed to facilitate enabling the node 600 to connect to client devices, other nodes, service servers, the NMC, and/or other components or devices. If the node 600 is offline for any reason, the IP addresses (e.g., virtual IP addresses) of the node 600 can be migrated (e.g., moved or transferred) to another node associated with the cluster (e.g., another node associated with a network of the cluster) to facilitate redistributing client devices of clients to other nodes associated with the cluster if the node 600 is offline.

The interconnect component 606 can be associated with the network component 604 and/or other components to facilitate providing desired interconnects to the network component 604 and/or the other components. For instance, in some embodiments, a portion of the interconnect component 606 can be part of the network component 604. The interconnect component 606 can comprise various types of interconnects (e.g., interconnect sub-components) that can be utilized to connect the node 600 to other nodes of the cluster of nodes, connect various components (e.g., processor component 602, interface component 608, NMC 610, service server 612, service server 614, data store 616, memory component 618, controller component 620, or other component) of the node 600, or connection the node 600 to other components (e.g., another node(s), NMC, client device, service server, file system, or other component) of or associated with the storage system. The interconnects can comprise, for example, Ethernet interconnects or other low-latency interconnects (e.g., low-latency InfiniBand interconnects) that can be utilized to provide desirably fast and low-latency connections between respective components of or associated with the node 600. For instance, the memory component 618 (e.g., memory cache of the memory component 618) can communicate via a desirably fast (e.g., low-latency) interconnect (e.g., internal interconnect) of the interconnect component 606 to another memory component(s) of another node(s) of the cluster of nodes to desirably communicate or otherwise make available the data in the memory component 618 to the other memory component(s) or to access data in the other memory component(s), wherein such interconnect can have a significantly lower latency than accessing a hard disk drive of a node. The interconnect component 606 also can comprise desirably fast interconnects between different memory sub-components (e.g., different caches) of the memory component 618.

The interface component 608 can comprise various interfaces, such as, for example, application programming interfaces (APIs), interconnect interfaces, communication interfaces, a display screen, display interfaces, audio interfaces, haptic interface, and/or other desired interfaces, to facilitate (e.g., enable) transmitting or presenting information to a user or a device (e.g., service server, another node, or client or communication device, such as a computer, server, or mobile (e.g., smart) phone), or receiving information (e.g., query or request for a service; or request for information) from a service server or the NMC.

The NMC 610 can inform clients about the network capabilities or addresses of local or remote nodes, determine or identify (e.g., discover) desirable (e.g., suitable, preferable, or optimal) interfaces, network addresses, and associated nodes that can be utilized to perform a desired service for a client (e.g., in response to a client request), and manage connections of clients to interfaces (e.g., via network addresses) and associated nodes, in accordance with the defined network management criteria, such as more fully described herein. The NMC 610 also can coordinate and synchronize with one or more other NMCs (e.g., of or associated with one or more other nodes), and can exchange information with the one or more other NMCs, to facilitate identifying desirable interfaces, network addresses, and associated nodes that can be utilized to perform a desired service for a client, and managing connections of clients to interfaces and associated nodes, wherein such information can comprise or relate to interfaces, network addresses, operational statuses of nodes and associated services, network identifiers, node identifiers, and/or other desired information.

The service server 612 can facilitate handling client requests received from client devices and provisioning services for the client devices in response to the client requests. In some embodiments, the service server 612 can be an SMB server (e.g., SMB multichannel server) that can employ a desired SMB protocol to facilitate establishing SMB sessions. For example, the service server 612 can employ the desired SMB protocol to facilitate establishing a single SMB session over one or multiple network connections, which can enhance (e.g., increase) data transfer speeds, provide desired data redundancy, and/or enhance performance and reliability in processing service requests.

The service server 614 also can facilitate handling client requests received from client devices and provisioning services for the client devices in response to the client requests. In certain embodiments, the service server 614 can employ a data mover service can utilize the data mover service to move data between different types of client service servers, which can have respective (e.g., different) protocols and semantics associated with the data. In some embodiments, the service server can attempt to establish connections to usable nodes (e.g., available candidate nodes) in a network associated with a client device, can create a mesh of connections between multiple (e.g., a desired number of; or many) source servers and destination nodes, and/or can establish a "many to many" connection spread across all or a desired portion of available candidate nodes. It is to be appreciated and understood that, in other embodiments, the node 600 can comprise one or more other types of service servers, in addition to or as an alternative to service server 612 and/or service server 614.

The data store 616 can store data structures (e.g., user data, metadata), code structure(s) (e.g., modules, objects, hashes, classes, procedures) or instructions, information relating to files, file systems, communication connection operations, read operations, write operations, data storage operations, data or file search operations, networking of network addresses, interfaces, and/or nodes, applications, services, requests, queries, metadata, parameters, traffic flows, policies, algorithms (e.g., network management algorithms, hash algorithms, compression algorithms, decompression algorithms), protocols, interfaces, tools, and/or other information, to facilitate controlling operations associated with the node 600. In an aspect, the processor component 602 can be functionally coupled (e.g., through a memory bus) to the data store 610 in order to store and retrieve information desired to operate and/or confer functionality, at least in part, to the network component 604, interconnect component 606, interface component 608, NMC 610, service server 612, service server 614, data store 616, memory component 618, controller component 620, or other component, and/or substantially any other operational aspects of the node 600.

The memory component 618 can include one or more volatile or non-volatile memory sub-components (e.g., cache memory) that can be utilized to store data, such as the various types of data disclosed herein. The memory sub-components of the memory component 618 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), non-volatile RAM (NVRAM), and/or other desired type of memory. One or more memory sub-components can be one or more caches.

The controller component 620 can be or can comprise a disk controller that can enable the processor component 602, or portion thereof, to communicate with the data store 616 (e.g., a hard disk of the data store 616) or other type of storage media or storage drive (e.g., disk drive) of or associated with the node 600. The controller component 620 also can provide or facilitate providing an interface between the hard disk or disk drive and other components of the node 600.

Figure 7:
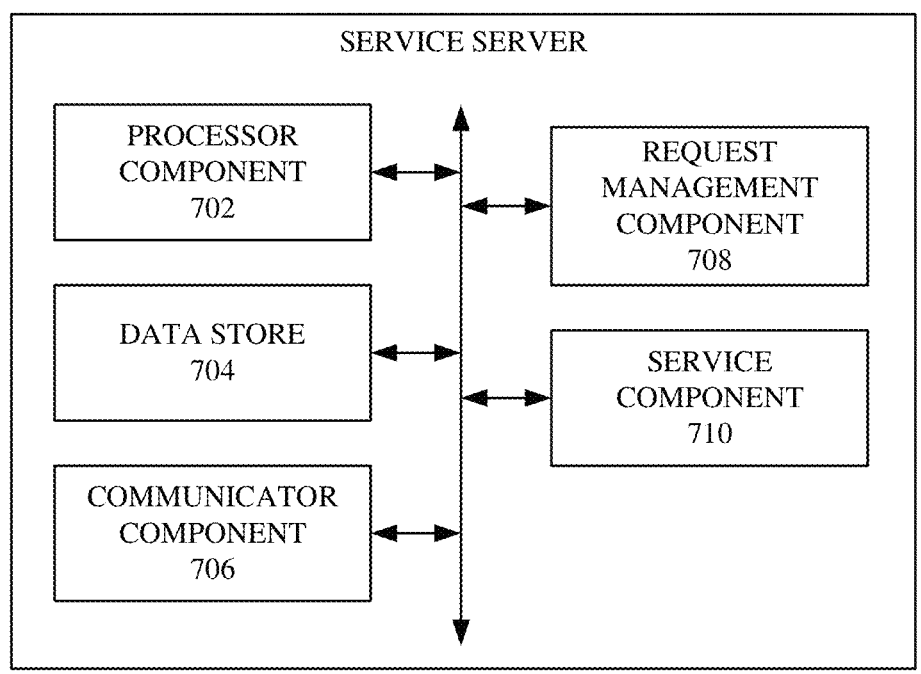
FIG. 7 illustrates a block diagram of an example service server, in accordance with various aspects and embodiments of the disclosed subject matter.

FIG. 7 illustrates a block diagram of an example service server 700, in accordance with various aspects and embodiments of the disclosed subject matter. The service server 700 can comprise a processor component 702, a data store 704, a communicator component 706, a request management component 708, and a service component 710.

The processor component 702 can include can work in conjunction with the other components (e.g., data store 704, communicator component 706, request management component 708, service component 710, and/or another component) to facilitate performing the various functions of the service server 700. The processor component 702 can employ one or more processors (e.g., one or more CPUs), microprocessors, or controllers that can process data, such as information relating to requests, queries, applications, services, network addresses, network identifiers, node identifiers, files, file systems, communication connection operations, metadata, parameters, traffic flows, policies, algorithms (e.g., request processing algorithms, service-related algorithms), protocols, interfaces, tools, and/or other information, to facilitate operation of the service server 700, and control data flow between the service server 700 and other components (e.g., a node(s), NMC, client device, file system, or other component) associated with the service server 700.

The data store 704 can store data structures (e.g., user data, metadata), code structure(s) (e.g., modules, objects, hashes, classes, procedures) or instructions, information relating to requests, queries, applications, services, network addresses, network identifiers, node identifiers, files, file systems, communication connection operations, metadata, parameters, traffic flows, policies, algorithms (e.g., request processing algorithms, service-related algorithms), protocols, interfaces, tools, and/or other information, to facilitate controlling operations associated with the service server 700. In an aspect, the processor component 702 can be functionally coupled (e.g., through a memory bus) to the data store 704 in order to store and retrieve information desired to operate and/or confer functionality, at least in part, to the data store 704, communicator component 706, request management component 708, service component 710, or other component, and/or substantially any other operational aspects of the service server 700.

The communicator component 706 can comprise communication functionality and interfaces that can enable the communicator component 706 to transmit or receive data. The communicator component 706 can receive requests and request-related information from client devices. The communicator component 706 also can receive information relating to network address discovery and processing of client requests for services from the NMC, wherein such information can comprise, for example, an error message, or a response message, which can include information relating to one or more selected network addresses associated with one or more available candidate nodes, or a ranked list or order of one or more network addresses associated with one or more available candidate nodes, that can be utilized to process a client request and provide a desired service in response to the client request. The communicator component 706 can transmit request-related information relating to client requests to the NMC, wherein the request related information can comprise information contained in a client request, metadata, a network identifier relating to or identifying a network of nodes, a node identifier relating to or identifying a node(s), or other desired information, such as described herein. The communicator component 706 also can transmit information related to or responsive to the client request to a client device to facilitate providing the client device the desired service, or notifying the client device that no node is available or able to process the client request and provide the desired service.

The request management component 708 can manage client requests associated with client devices and clients. In some embodiments, in response to a client request for a service that is received from a client device, the request management component 708 can determine whether multichannel is enabled (e.g., with regard to an SMB service server), and, if multichannel is enabled, can fetch a local network address (e.g., local network address with which the client device is connected) that can be utilized to facilitate determining the network address space associated with the client device. In certain embodiments, in response to a client request for a service that is received from a client device, the request management component 708 can determine whether there is a configured network (e.g., configured node network) that can be used with regard to the client request (e.g., with regard to a service server that can employ a data mover service, such as described herein). If it is determined that there is a configured network that can be used with regard to the client request, the request management component 708 can obtain the name of the configured network and can include the name of the configured network as a network identifier in the request-related information the service server 700 communicates to the NMC. If it is determined that there is not a configured network that can be used with regard to the client request, the request management component 708 can obtain a local network address associated with the client device and can include the local network address as a network identifier in the request-related information the service server 700 communicates to the NMC.

In some embodiments, when the service server 700 is an SMB service server, the request management component 708 can convert information contained in a message (e.g., error message, or response message) received from the NMC to an SMB representation, in accordance with a desired SMB format and protocol.

The service component 710 can provide or facilitate provision of services, such as services requested in client requests received from client devices. For instance, the service component 710 can coordinate or work in conjunction with one or more nodes (e.g., available candidate nodes) of one or more node networks of a cluster of nodes to process client requests and provide desired requested services to the client devices, in response to the client requests, such as described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 8:
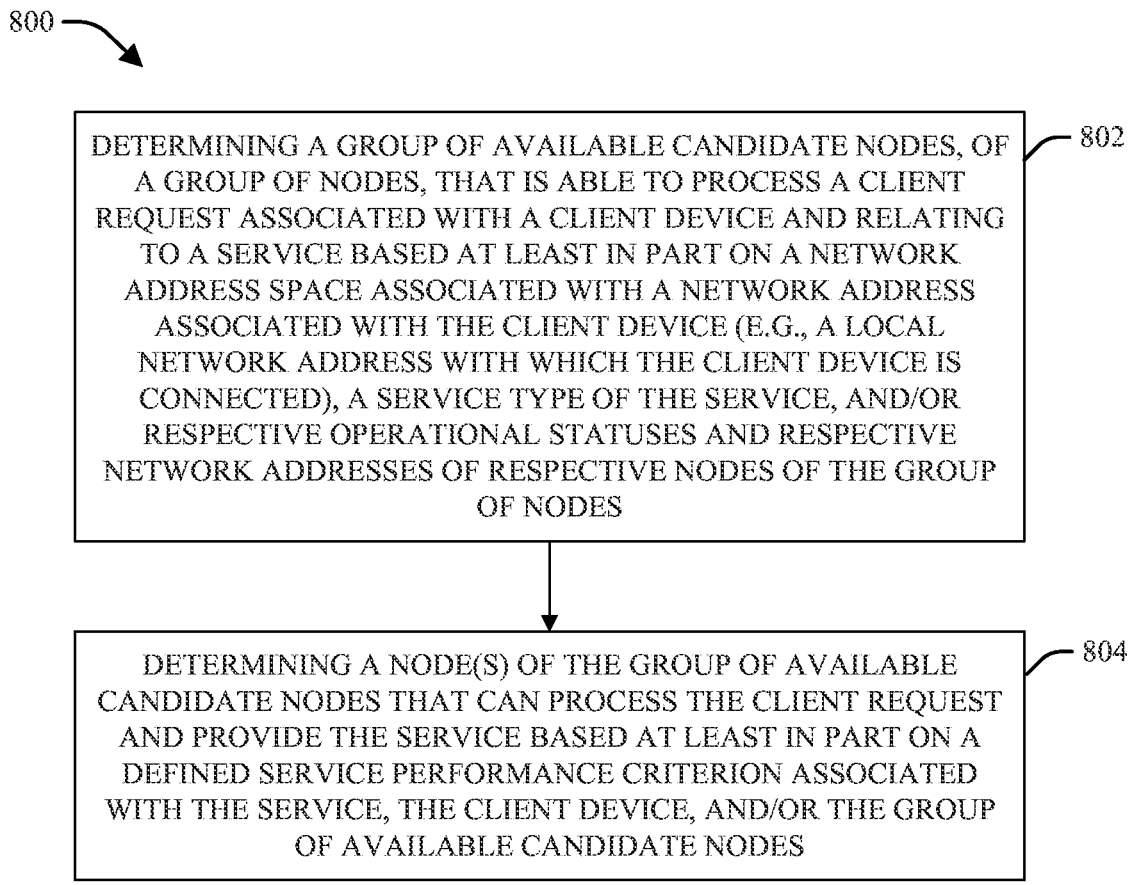
FIG. 8 illustrates a flow chart of an example method that can determine a network address(es) and associated node(s) to utilize to process a request for a service received from or associated with a client device, in accordance with various aspects and embodiments of the disclosed subject matter.
Figure 9:
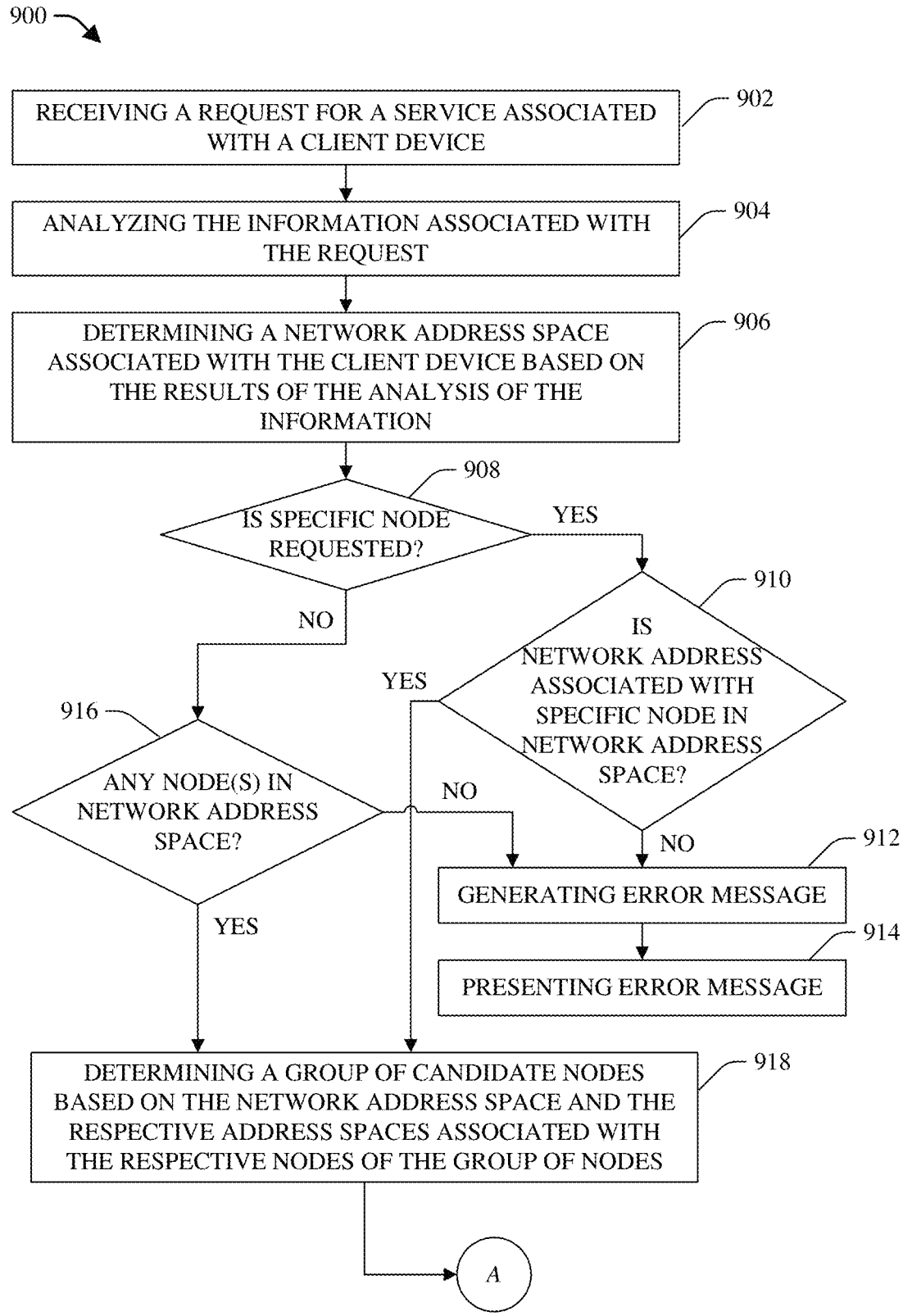
FIGS. 9 and 10 present a flow chart of another example method that can determine a network address(es) and associated node(s) to utilize to process a request for a service received from or associated with a client device, in accordance with various aspects and embodiments of the disclosed subject matter.
Figure 10:
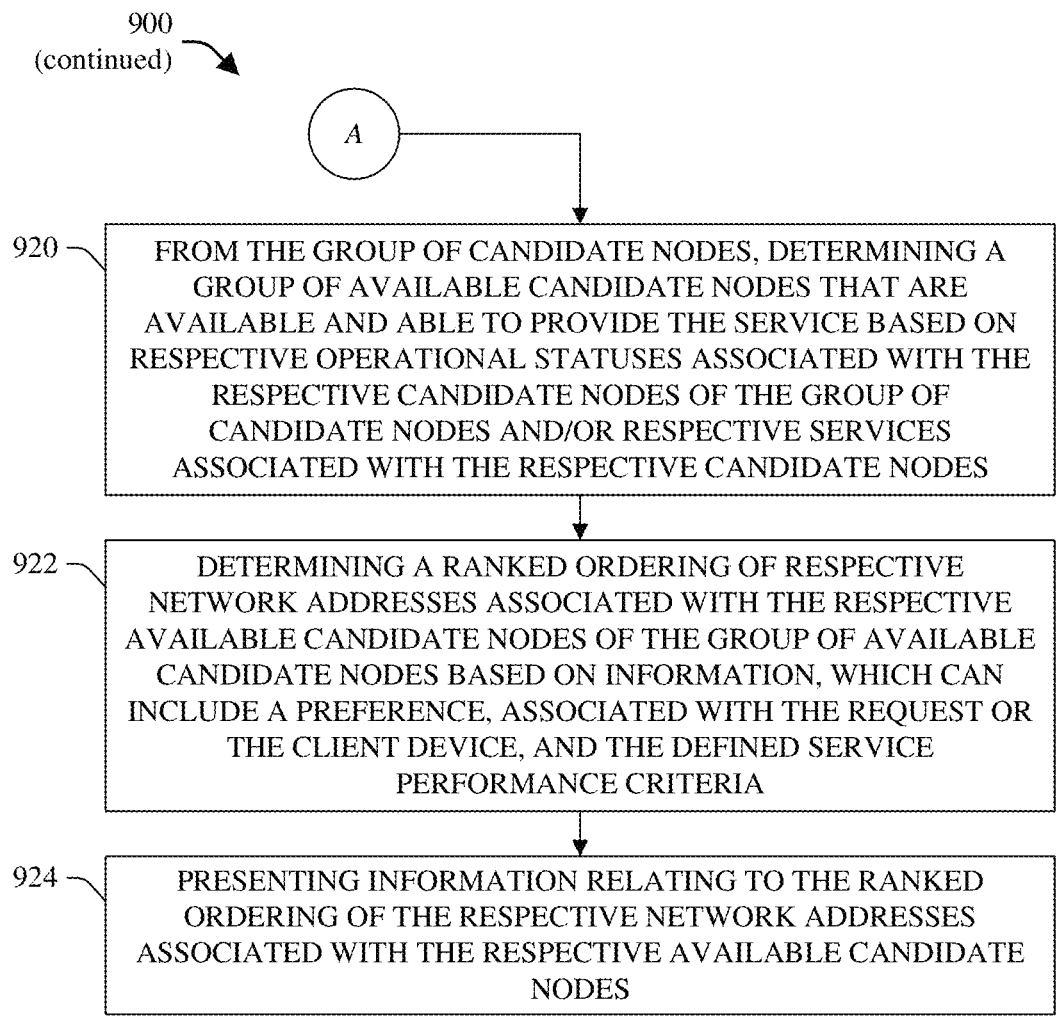

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 that can determine a network address(es) and associated node(s) to utilize to process a request for a service received from or associated with a client device, in accordance with various aspects and embodiments of the disclosed subject matter. The method 800 can be employed by, for example, a system comprising the NMC, a processor component (e.g., of or associated with the NMC), and/or data store (e.g., of or associated with the NMC and/or the processor component).

At 802, a group of available candidate nodes, of a group of nodes, that is able to process a client request associated with a client device and relating to a service can be determined based at least in part on a network address space associated with a network address associated with the client device (e.g., a local network address with which the client device is connected), a service type of the service, and/or respective operational statuses and respective network addresses of respective nodes of the group of nodes. The NMC can determine the network address space associated with the client device based at least in part on a network identifier associated with the client device and/or a node identifier that can facilitate identifying a node(s), such as described herein. The network identifier can be, for example, the local network address, VLAN tag, a name of a configured network address space, or other type of network identifier. The NMC can determine a group of candidate nodes from a group of nodes based at least in part on the network address space and respective network addresses associated with respective nodes of the group of nodes, such as described herein. The NMC can determine the group of available candidate nodes, of the group of candidate nodes, that is able to process the client request associated with the client device and relating to the service based at least in part on the service type of the service and the respective operational statuses associated with the respective nodes of the group of available candidate nodes or respective services associated with those respective nodes.

At 804, a node(s) of the group of available candidate nodes that can process the client request and provide the service can be determined based at least in part on a defined service performance criterion associated with the service, the client device, and/or the group of available candidate nodes. The NMC can determine the node(s) of the group of available candidate nodes that can process the client request and provide the service based at least in part on the defined service performance criterion associated with the service, the client device, and/or the group of available candidate nodes.

FIGS. 9 and 10 present a flow chart of another example method 900 that can determine a network address(es) and associated node(s) to utilize to process a request for a service received from or associated with a client device, in accordance with various aspects and embodiments of the disclosed subject matter. The method 900 can be employed by, for example, a system comprising the NMC, a processor component (e.g., of or associated with the NMC), and/or data store (e.g., of or associated with the NMC and/or the processor component).

At 902, a request for a service associated with a client device can be received. The NMC can receive the request for the service from a client service server (e.g., a service server that can facilitate providing the requested service), which can receive a request for the service from the client device when the client device connects to the service (e.g., connects to the client service server or other service device associated with the service). The request can comprise information, comprising a network identifier associated with the client device and/or a node identifier relating to a node(s), such as described herein. The network identifier can comprise, for example, the network address (e.g., local network address with which the client device is connected), a VLAN tag, a name of the configured network address space, or other network identifier associated with the client device. The node identifier can indicate, for example, a local node, any remote node with connectivity, or a specific remote node.

At 904, the information associated with the request can be analyzed. The NMC can analyze the information (e.g., network identifier, node identifier, and/or other request-related information) associated with the request.

At 906, a network address space associated with the client device can be determined based at least in part on the results of the analysis of the information. The NMC can determine the network address space associated with the client device (e.g., associated with the network address (e.g., network address to which the client device is connected) or another type of network identifier) based at least in part on the results of the analysis of the information associated with the request.

At 908, a determination can be made regarding whether a specific node has been requested in the request. Based at least in part on the results of the analysis of the information (e.g., node identifier, if any) associated with the request, the NMC can determine whether a specific node has been requested (e.g., by the client device) in the request associated with the client device.

If the specific node has been requested, at 910, a determination can be made regarding whether a network address associated with the specific node is in the network address space associated with the client device. If the NMC determines that the specific node has been requested, the NMC can determine whether the network address associated with the specific node is in (e.g., is part of, included in, or located in) the network address space associated with the client device.

If the network address associated with the specific node is not in the network address space, at 912, an error message can be generated. At 914, the error message can be presented. If the NMC determines that the network address associated with the specific node is not in the network address space associated with the client device, the NMC can generate the error message, and can present (e.g., communicate, display, or otherwise present) the error message. The error message can indicate that the specific node is not in the network address space associated with the client device, and thus, the specific node is not able or permitted to process the request and provide the requested service to the client device.

Referring again to reference numeral 910, if, instead, at 910, it is determined that the network address associated with the specific node is in the network address space, the method 900 can proceed to reference numeral 918 and can proceed from that point, as the specific node can be deemed a candidate node that can be further considered by the NMC to determine whether such candidate node is an available candidate node, such as described herein.

Referring again to reference numeral 908, if, instead, at 908, it is determined that a specific node has not been requested, at 916, a determination can be made regarding there is any node in the group of nodes that is in the network address space. If the NMC determines that no specific node has been requested, the NMC can determine whether there is any node in the group of nodes that is in the network address space.

If it is determined that there is no node in the group of nodes that is in the network address space, the method 900 can proceed to reference numeral 912 where an error message can be generated, and reference numeral 914 where the error message can be presented. If the NMC determines that there is no node (e.g., no candidate node) in the group of nodes that is in the network address space associated with the client device, the NMC can generate and present the error message, wherein the error message can indicate that there is no node that is in the network address space associated with the client device, and thus, there is no candidate node that is able or permitted to process the request and provide the requested service to the client device.

If, instead, at reference numeral 916, it is determined that there is one or more respective candidate nodes of the group of nodes that has or have one or more respective network addresses that is or are in the network address space, at 918, a group of candidate nodes can be determined based at least in part on the network address space and the respective address spaces associated with the respective nodes of the group of nodes. The NMC can determine the group of candidate nodes from the group of nodes based at least in part on the network address space associated with the client device and the respective network addresses associated with the respective nodes of the group of nodes. For instance, the NMC can determine which of the respective network addresses associated with the respective nodes are in (e.g., are part of, included in, or located in) the network address space associated with the client device, and can include any of the respective nodes, which have respective network addresses that are in the network address space, in the group of candidate nodes, and can filter out any nodes associated with respective network addresses that are not in the network address space.

At this point, the method 900 can proceed to reference point A, wherein the method 900, as depicted in FIG. 10, can continue, proceeding from reference point A to reference numeral 920, as described herein.

At 920, from the group of candidate nodes, a group of available candidate nodes that are available and able to provide the service can be determined based at least in part on respective operational statuses associated with the respective candidate nodes of the group of candidate nodes and/or respective services associated with the respective candidate nodes. The NMC can analyze operational status information and/or other information that can indicate the respective operational statuses of the respective candidate nodes and/or the respective services associated with the respective candidate nodes. Based at least in part on the results of such analysis, the NMC can determine whether any of the respective candidate nodes are available and able to provide (e.g., able to run) the requested service, such as described herein. The NMC can include one or more respective candidate nodes, which are available and able to provide the requested service, in the group of available candidate nodes. The NMC can filter out any candidate node that is not available (e.g., is deactivated, inactive, or otherwise unavailable) and/or is not able to provide the requested service.

At 922, a ranked ordering of respective network addresses associated with the respective available candidate nodes of the group of available candidate nodes can be determined based at least in part on information, which can include a preference, associated with the request or the client device, and the defined service performance criteria. The NMC can analyze the information, which can include the preference (or may not include a preference), associated with the request or the client device and can apply the defined service performance criteria to such information. Based at least in part on the results of such analysis, the NMC can determine the ranked ordering of the respective network addresses associated with the respective available candidate nodes of the group of available candidate nodes, in accordance with the defined service performance criteria. The NMC can rank (e.g., can determine respective rank scores and rank) the respective available candidate nodes from best (or highest) to worst (or lowest) in satisfying the defined service performance criteria, such as more fully described herein. The NMC can determine and generate the ranked ordering to order the respective network addresses and associated respective available candidate nodes in accordance with the respective rankings of the respective available candidate nodes.

At 924, information (e.g., a list) relating to the ranked ordering of the respective network addresses associated with the respective available candidate nodes can be presented. The NMC can present (e.g., communicate, display, or otherwise present) the information (e.g., the list) relating to the ranked ordering of the respective network addresses associated with the respective available candidate nodes to the client service server. In some embodiments, the information relating to the ranked ordering can comprise one network address associated with one available candidate node (e.g., the top ranked or best available candidate node). In other embodiments, the information relating to the ranked ordering can comprise respective network addresses associated with respective available candidate nodes, in accordance with the respective ranking of the respective available candidate nodes.

In some embodiments, after receiving such information, the client service server can determine and/or select one or more desirable network addresses (e.g., one or more of the best, most favorable, or highest or higher ranked network addresses) from the ranked ordering of the respective network addresses associated with the respective available candidate nodes and/or based at least in part on the ranked ordering based at least in part on (e.g., in accordance with) the respective rankings of the respective network addresses, the defined service performance criteria, and/or client preference. In other embodiments, the client service server can present the information relating to the ranked ordering of the respective network addresses associated with the respective available candidate nodes (or corresponding information relating thereto) to the client device, wherein the client device or a user (e.g., client) associated with the client device can select one or more desirable network addresses (e.g., one or more of the best, most favorable, or highest or higher ranked network addresses) associated with one or more of the available candidate nodes from the ranked ordering of the respective network addresses based at least in part on (e.g., in accordance with) the respective rankings of the respective network addresses in the ranked ordering, the defined service performance criteria, and/or the client preference. The client device can utilize the one or more selected network addresses (e.g., as selected by the service server, the client device, or the client) to connect to the network via one or more communication connections associated with one or more interfaces (e.g., that are associated with the one or more selected network addresses) associated with the one or more available candidate nodes. The one or more available candidate nodes can process the client request, perform the service, determine and/or generate request results (e.g., request results that can be responsive to the request), and/or provide (e.g., communicate, present, or display) the request results (e.g., result information relating to the request results) to the client device.

Figure 11:
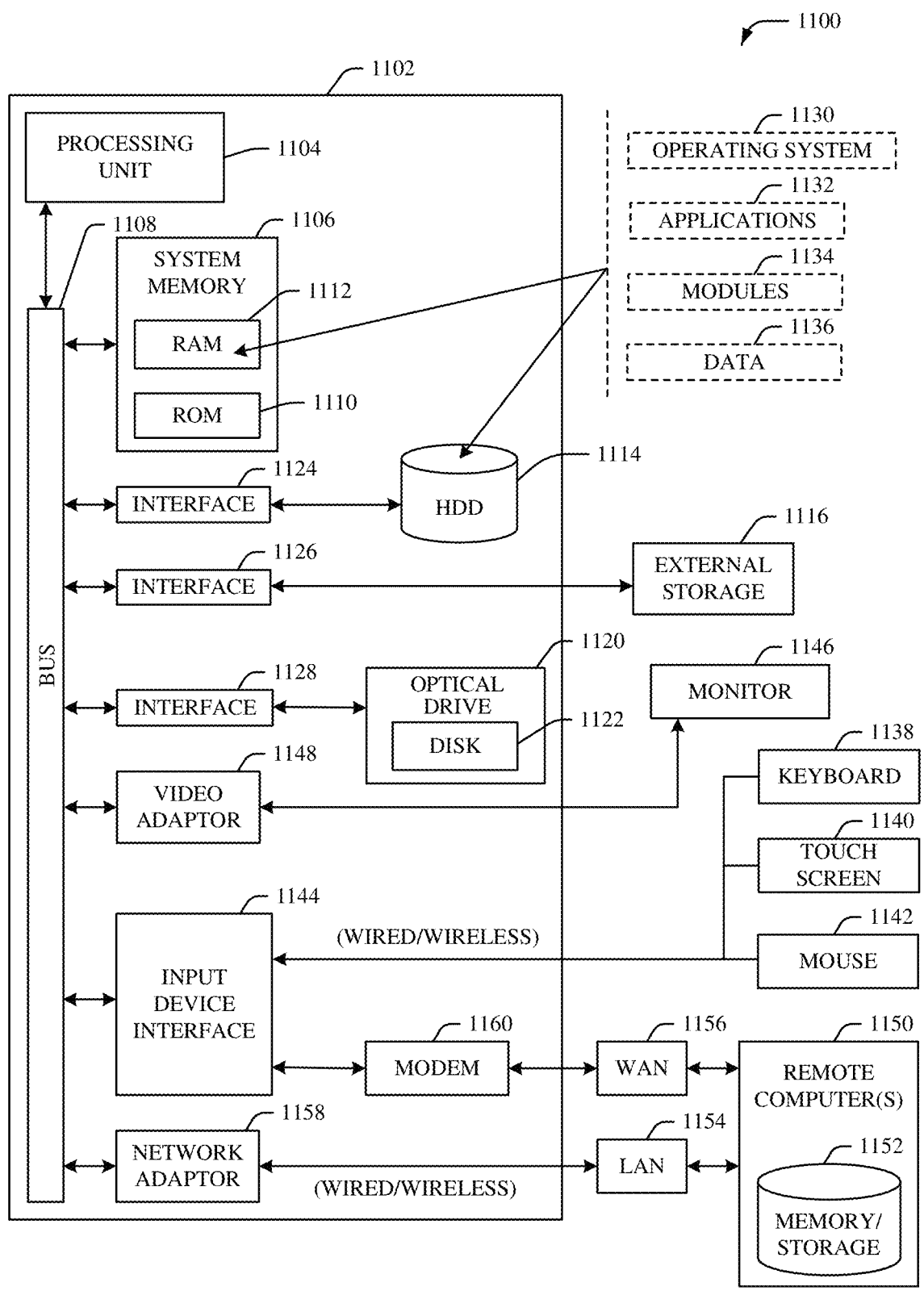
FIG. 11 illustrates an example block diagram of an example computing environment in which the various embodiments of the embodiments described herein can be implemented.

In order to provide additional context for various embodiments described herein, FIG. 11 and the following discussion are intended to provide a brief, general description of a suitable computing environment 1100 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156, e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., NMC, node, cluster, network, service server, client device, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   with regard to a client request associated with a client device, determining, by a system comprising a processor, a group of candidate nodes from a group of nodes based on a network address space associated with a network address associated with the client device and respective first network addresses associated with respective nodes of the group of nodes;
   from the group of candidate nodes, determining, by the system, a group of available candidate nodes that is able to process the client request associated with the client device and relating to a service based on a service type of the service, and respective operational statuses of respective candidate nodes of the group of candidate nodes, wherein the group of available candidate nodes comprises some candidate nodes of the group of candidate nodes, wherein the group of available candidate nodes comprises respective available candidate nodes comprising a first available candidate node and a second available candidate node, and wherein some of the respective first network addresses are respective second network addresses associated with the respective available candidate nodes;
   ranking, by the system, the respective second network addresses associated with the respective available candidate nodes of the group of available candidate nodes based on respective bandwidths associated with the respective available candidate nodes, wherein the respective second network addresses comprise a first network address and a second network address associated with the first available candidate node and a third network address associated with the second available candidate node, and wherein the ranking comprises ranking the first network address and the second network address higher than the third network address based on determining that a first bandwidth associated with a combination of the first network address and the second network address is higher than a second bandwidth associated with the second network address; and
   determining, by the system, an available candidate node of the group of available candidate nodes that is to process the client request based on the ranking and a defined service performance criterion associated with the service.

2. The method of claim 1, further comprising:
   determining, by the system, the network address space associated with the network address associated with the client device based on an analysis of request information or metadata associated with the client request, wherein the request information or the metadata comprises a network identifier or a node identifier, wherein the network identifier comprises a particular network address to which the client device is connected, a virtual local area network tag, or a name of the network address space, and wherein the network address associated with the client device is the particular network address to which the client device is connected.

3. The method of claim 1, wherein the determining of the group of candidate nodes from the group of nodes further comprises:
   determining, by the system, from the group of nodes, the group of candidate nodes associated with the network address space based on an analysis of the network address space and node information relating to the group of nodes, wherein the node information comprises the respective first network addresses associated with the respective nodes of the group of nodes.

4. The method of claim 3, wherein the group of nodes comprises the first available candidate node associated with the first network address and the second network address, the second available candidate node associated with the third network address, and a node associated with a fourth network address, and wherein the method further comprises:
   based on the analysis of the network address space and the node information relating to the group of nodes:
      determining, by the system, that the first available candidate node and the second available candidate node are to be included in the group of candidate nodes based on the first network address, the second network address, and the third network address being determined to be in the network address space; or
      determining, by the system, that the node is not to be included in the group of candidate nodes based on the fourth network address being determined to not be in the network address space.

5. The method of claim 1, wherein the determining of the group of available candidate nodes comprises determining the group of available candidate nodes from the group of candidate nodes based on respective services associated with the respective candidate nodes, the respective operational statuses of the respective candidate nodes or respective service operational statuses of the respective services associated with the respective candidate nodes, and the service type of the service associated with the client request.

6. The method of claim 5, further comprising:
tracking, by the system, operational data associated with the group of candidate nodes, wherein the operational data relates to the respective operational statuses of the respective candidate nodes or the respective service operational statuses of the respective services associated with the respective candidate nodes;
analyzing, by the system, the operational data; and
based on the analyzing of the operational data, determining, by the system, the respective operational statuses of the respective candidate nodes or the respective service operational statuses of the respective services associated with the respective candidate nodes.

7. The method of claim 6, wherein the group of candidate nodes comprises the first available candidate node, the second available candidate node, and a candidate node, wherein the respective services comprise a first service associated with the first available candidate node and a second service associated with the candidate node, wherein the respective operational statuses comprise a first operational status, which represents a first operational status of the first available candidate node or a first service operational status of the first service, and a second operational status, which represents a second operational status of the candidate node or a second service operational status of the second service, and wherein the method further comprises:
based on the operational data associated with the group of candidate nodes:
determining, by the system, that the first available candidate node is to be included in the group of available candidate nodes based on the first operational status indicating that the first available candidate node is active and available and the first service operational status indicating that the first service is available to be operated on the first node, wherein the first service corresponds to the service type of the service associated with the client request; or
determining, by the system, that the candidate node is not to be included in the group of available candidate nodes based on the second operational status indicating that the candidate node is inactive or unavailable or the second service operational status indicating that the second service is unavailable or does not correspond to the service type of the service associated with the client request.

8. The method of claim 1, wherein the determining of the available candidate node of the group of available candidate nodes that is to process the client request comprises determining the available candidate node of the group of available candidate nodes that is to process the client request based on the respective bandwidths associated with the respective available candidate nodes, whether a safe failover is to be applied in connection with processing the client request, respective loads associated with the respective available candidate nodes, or respective speeds associated with respective interfaces associated with the second respective network addresses associated with the respective available candidate nodes, in accordance with the defined service performance criterion.

9. The method of claim 1, wherein the ranking further comprises ranking the respective second network addresses associated with the respective available candidate nodes of the group of available candidate nodes based on the respective bandwidths associated with the respective available candidate nodes, whether a safe failover is to be applied in connection with processing the client request, respective loads associated with the respective available candidate nodes, or respective speeds associated with respective interfaces associated with the respective second network addresses, in accordance with the defined service performance criterion; and wherein the method further comprises:
based on the ranking, determining, by the system, a ranked order of the respective second network addresses associated with the respective available candidate nodes of the group of available candidate nodes, wherein one or more of the respective second network addresses is selectable to process the client request based on the ranked order of the respective second network addresses.

10. The method of claim 1, wherein the client request is a first client request, and wherein the method further comprises:
receiving, by the system, a second client request associated with the client device and relating to the service, wherein the second client request requests that a specified node of the group of nodes process the second client request;
determining, by the system, that the specified node is not part of the network address space associated with the network address associated with the client device based on the network address space associated with the network address associated with the client device, and based on a specified network address associated with the specified node; and
in response to determining that the specified node is not part of the network address space associated with the network address associated with the client device, generating, by the system, an error message that indicates the specified node is not able to process the second client request.

11. The method of claim 1, wherein the client request is a first client request, and wherein the method further comprises:
receiving, by the system, a second client request associated with the client device and relating to the service;
determining, by the system, that no node of the group of nodes is qualified to be the available candidate node that is able to process the second client request based on the network address space associated with the network address associated with the client device, the service type of the service, or the respective operational statuses or the respective first network addresses of the respective nodes; and
in response to determining that no node is qualified to be the available candidate node that is able to process the second client request, generating, by the system, an error message that indicates the no node is qualified to process the second client request.

12. A system, comprising:
a memory that stores computer executable components; and
a processor that executes computer executable components stored in the memory, wherein the computer executable components comprise:
a request component that receives a request from a device, wherein the request relates to a service; and a network management component that, with regard to the request:
  determines a group of candidate nodes from a group of nodes based on a network address space associated with a network address associated with the device and respective first network addresses associated with respective nodes of the group of nodes;
  determines, from the group of candidate nodes, a group of available candidate nodes that is able to process the request based on a service type of the service, and respective operational statuses of respective candidate nodes of the group of candidate nodes, wherein the group of available candidate nodes comprises some candidate nodes of the group of candidate nodes, wherein the group of available candidate nodes comprises respective available candidate nodes comprising a first available candidate node and a second available candidate node, and wherein some of the respective first network addresses are respective second network addresses associated with the respective available candidate nodes;
  ranks the second respective network addresses associated with the respective available candidate nodes of the group of available candidate nodes based on respective bandwidths associated with the respective available candidate nodes, wherein the second respective network addresses comprise a first network address and a second network address associated with the first available candidate node and a third network address associated with the second available candidate node, and wherein the ranking comprises ranking the first network address and the second network address higher than the third network address based on determining that a combined bandwidth associated with a combination of the first network address and the second network address that are associated with the first available candidate node is higher than a bandwidth associated with the second network address associated with the second available candidate node; and
  determines an available candidate node of the group of available candidate nodes that is to process the request based on the ranking of the respective second network addresses associated with the respective available candidate nodes of the group of available candidate nodes and a defined service performance criterion associated with the device.

13. The system of claim 12, wherein the available candidate node processes, writes, reads, stores, presents, or communicates data, wherein the available candidate node writes the data to a data store of the available candidate node, reads the data from the data store, or stores the data in the data store, wherein the available candidate node communicates the data to the device, another node, or another device, or wherein the available candidate node presents the data via an interface component.

14. The system of claim 12, wherein the network management component determines the network address space associated with the network address associated with the device based on an analysis of request information or metadata associated with the request, wherein the request information or the metadata comprises a network identifier or a node identifier, wherein the network identifier comprises a specified network address to which the device is connected, a virtual local area network tag, or a name of the network address space, and wherein the network address associated with the client device is the specified network address to which the client device is connected.

15. The system of claim 14, wherein the network management component determines whether the respective nodes of the group of nodes are to be included in the group of candidate nodes based on a first result of a first determination of whether the respective first network addresses associated with the respective nodes of the group of nodes are within the network address space.

16. The system of claim 15, wherein the network management component determines the respective operational statuses of the respective candidate nodes of the group of candidate nodes based on operational data associated with the respective candidate nodes, wherein the operational data indicates the respective operational statuses of the respective candidate nodes or respective service operational statuses of respective services associated with the respective candidate nodes, and
  wherein the network management component determines whether the respective candidate nodes of the group of candidate nodes are to be included in the group of available candidate nodes based on a second result of a second determination of whether the respective operational statuses of the respective candidate nodes or the respective service operational statuses of the respective services indicate that the respective candidate nodes are capable of performing, and are available to perform, the service associated with the request.

17. The system of claim 12, wherein the network management component ranks the respective second network addresses associated with the respective available candidate nodes of the group of available candidate nodes based on the respective bandwidths associated with the respective available candidate nodes, whether a safe failover is to be applied in connection with processing the request, respective loads associated with the respective available candidate nodes, or respective speeds associated with respective interfaces associated with the respective second network addresses, in accordance with the defined service performance criterion, and
  wherein, based on the ranking of the respective second network addresses associated with the respective available candidate nodes of the group of available candidate nodes, the network management component generates a ranked order of the respective second network addresses, and wherein one or more of the respective second network addresses is selectable for use in connection with the request based on the ranked order of the second respective network addresses.

18. The system of claim 12, wherein the request is a first request, wherein the network management component receives a second request associated with the device and relating to the service, wherein the second request requests that a particular node of the group of nodes process the second request, and
  wherein, based on the network address space associated with the network address associated with the device, and based on a particular network address associated with the particular node, the network management component determines that the particular node is not part of the network address space associated with the network address associated with the device and generates an error message that indicates the particular node is not able to process the second request.

19. A non-transitory machine-readable medium, comprising executable instructions that, when executed by a processor, facilitate performance of operations, comprising:

with regard to a query associated with a device, determining a group of candidate node devices from a group of node devices based on a network address space associated with a network address associated with the device and respective first network addresses associated with respective node devices of the group of node devices;

from a group of candidate node devices, determining a group of available candidate node devices that is able to process the query associated with the device and relating to a service based on a service type of the service, and respective operational statuses of respective candidate node devices of the group of candidate node devices, wherein the group of available candidate node devices comprises respective available candidate node devices comprising a first available candidate node device and a second available candidate node device, and wherein some of the respective first network addresses are respective second network addresses associated with the respective available candidate node devices;

determining respective ranking scores associated with the respective second network addresses associated with the respective available candidate node devices of the group of available candidate node devices based on respective bandwidths associated with the respective available candidate node devices, wherein the respective second network addresses comprise a first network address and a second network address associated with the first available candidate node device and a third network address associated with the second available candidate node device, and wherein a first ranking score associated with the first network address and a second ranking score associated with the second network address are higher than a third ranking score associated with the third network address based on determining that a combined bandwidth associated with the first network address and the second network address is higher than a bandwidth associated with the third network address; and determining an available candidate node device of the group of available candidate node devices that is to process the query based on the respective ranking scores and a defined service performance criterion associated with the group of available candidate node devices.

20. The non-transitory machine-readable medium of claim 19, wherein the determining of the available candidate node device of the group of available candidate node devices that is to process the query comprises determining one or more available candidate node devices of the group of available candidate node devices that is to process the query based on the respective bandwidths associated with the respective available candidate node devices, whether a safe failover is to be applied in connection with processing the query, respective loads associated with the respective available candidate node devices, or respective speeds associated with respective interfaces associated with the respective second network addresses associated with the respective available candidate node devices, in accordance with the defined service performance criterion, and wherein the one or more available candidate node devices comprises the available candidate node device.

* * * * *